US008871831B2

(12) United States Patent
Huang et al.

(10) Patent No.: US 8,871,831 B2
(45) Date of Patent: Oct. 28, 2014

(54) MODIFICATION OF SURFACES WITH POLYMERS

(71) Applicants: Jinyu Huang, Suwanee, GA (US); Alan J. Russell, Gibsonia, PA (US); Nicolay V. Tsarevsky, Dallas, TX (US); Krzysztof Matyjaszewski, Pittsburgh, PA (US)

(72) Inventors: Jinyu Huang, Suwanee, GA (US); Alan J. Russell, Gibsonia, PA (US); Nicolay V. Tsarevsky, Dallas, TX (US); Krzysztof Matyjaszewski, Pittsburgh, PA (US)

(73) Assignees: University of Pittsburgh—of the Commonwealth System of Higher Education, Pittsburgh, PA (US); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/065,370

(22) Filed: Oct. 28, 2013

(65) Prior Publication Data
US 2014/0058032 A1  Feb. 27, 2014

Related U.S. Application Data

(60) Continuation of application No. 13/734,747, filed on Jan. 4, 2013, which is a division of application No. 11/894,010, filed on Aug. 17, 2007, now Pat. No. 8,349,410.

(60) Provisional application No. 60/838,337, filed on Aug. 17, 2006.

(51) Int. Cl.
| C08L 33/00 | (2006.01) |
| C08L 39/00 | (2006.01) |
| C08F 120/34 | (2006.01) |
| C08F 220/34 | (2006.01) |
| C09D 5/14 | (2006.01) |
| C08L 53/00 | (2006.01) |
| C08F 255/02 | (2006.01) |
| C08F 293/00 | (2006.01) |
| C08L 33/14 | (2006.01) |
| C08F 291/00 | (2006.01) |
| C08F 265/06 | (2006.01) |

(52) U.S. Cl.
CPC ............... *C08L 33/14* (2013.01); *C08L 53/00* (2013.01); *C08F 255/02* (2013.01); *C08F 293/005* (2013.01); *C08F 120/34* (2013.01); *C08F 291/00* (2013.01); *C08F 265/06* (2013.01)
USPC ........ 523/122; 526/274; 526/287; 526/303.1; 526/307.4; 526/311; 526/217; 524/555; 524/556; 524/565

(58) Field of Classification Search
CPC .. C08F 261/00; C08F 261/10; C08F 2500/03; C08L 33/14
USPC .......................................................... 526/217
See application file for complete search history.

(56) References Cited

U.S. PATENT DOCUMENTS

| 5,128,386 | A | 7/1992 | Rehmer |
| 5,226,976 | A | 7/1993 | Carlson |
| 5,763,546 | A | 6/1998 | Jung |
| 5,789,487 | A | 8/1998 | Matyjaszewski |
| 5,807,937 | A | 9/1998 | Matyjaszewski |
| 5,945,491 | A | 8/1999 | Matyjaszewski |
| 6,051,625 | A | 4/2000 | Harkness |
| 6,111,022 | A | 8/2000 | Matyjaszewski |
| 6,121,371 | A | 9/2000 | Matyjaszewski |
| 6,124,411 | A | 9/2000 | Matyjaszewski |
| 6,162,882 | A | 12/2000 | Matyjaszewski |
| 6,407,187 | B1 | 6/2002 | Matyjaszewski |
| 6,413,587 | B1 | 7/2002 | Hawker |
| 6,512,060 | B1 | 1/2003 | Matyjaszewski |
| 6,586,491 | B2 | 7/2003 | Husemann |
| 6,624,262 | B2 | 9/2003 | Matyjaszewski |
| 6,627,314 | B2 | 9/2003 | Matyjaszewski |
| 6,632,481 | B1 | 10/2003 | Blum |
| 6,790,919 | B2 | 9/2004 | Matyjaszewski |
| 7,019,082 | B2 | 3/2006 | Matyjaszewski |
| 7,049,373 | B2 | 5/2006 | Matyjaszewski |
| 7,064,166 | B2 | 6/2006 | Matyjaszewski |
| 7,157,530 | B2 | 1/2007 | Matyjaszewski |
| 7,825,199 | B1 | 11/2010 | Matyjaszewski |
| 7,863,485 | B2 | 1/2011 | Cook |
| 2002/0006979 | A1 | 1/2002 | Hisemann |
| 2004/0260030 | A1 | 12/2004 | Husemann |
| 2005/0009995 | A1 | 1/2005 | Husemann |
| 2006/0003256 | A1 | 1/2006 | Takahashi |
| 2006/0008490 | A1 | 1/2006 | Russell |

(Continued)

FOREIGN PATENT DOCUMENTS

| WO | WO2002068485 | 9/2002 |
| WO | WO2004087777 | 10/2004 |

(Continued)

OTHER PUBLICATIONS

Decker, C. J. et al., Surface Protection of Poly(vinyl Chloride) by Photografting of Epoxy-Acrylate Coatings; Journal Appl. Polym. Sci.; 1983; vol. 28; 97-107.

(Continued)

Primary Examiner — Tae H Yoon
(74) Attorney, Agent, or Firm — Bartony & Associates, LLC

(57) ABSTRACT

A polymer formed by controlled radical polymerization includes groups that can be modified after controlled radical polymerization to form a radical. The polymer can be the reaction product of a controlled radical polymerization of radically polymerizable monomers, wherein at least one of the radically polymerizable monomers includes at least one group that can be modified after the controlled radical polymerization to form a radical.

20 Claims, 11 Drawing Sheets

(56) References Cited

U.S. PATENT DOCUMENTS

| | | |
|---|---|---|
| 2006/0052472 A1 | 3/2006 | Hansen |
| 2007/0122441 A1 | 5/2007 | Murata |
| 2009/0130157 A1 | 5/2009 | Ylitalo |
| 2010/0119833 A1 | 5/2010 | Madsen |

FOREIGN PATENT DOCUMENTS

| | | |
|---|---|---|
| WO | WO2005083435 | 9/2005 |
| WO | WO2005087818 | 9/2005 |
| WO | WO2005087819 | 9/2005 |
| WO | WO2007025086 | 3/2007 |
| WO | WO2007025310 | 3/2007 |
| WO | WO2007075817 | 7/2007 |
| WO | WO2008021500 | 2/2008 |

OTHER PUBLICATIONS

Ruckert, D.; Geuskens, G., Surface Modification of polymers-IV. Grafting of Acrylamide via an Unexpected Mechanism Using a Water Soluble Photo-Initiator, European Polymer Journal; 1996, vol. 32; No. 2; 201-208.

Balaji, R. et al.; Photocrosslinkable Copolymers Based on 4-Acryloyloxyphenyl-3'-Chlorostyryl Ketone and Methyl Methacrylate: Synthesis, Comonomer Reactivity Ratios and UV Photosensitivity; Polymer International; 2004; 53(11); 1735-1743.

Samuel, J. D. J. S.; Ruehe, J., A Facile Photochemical Surface Modification Technique for the Generation of Microstructured Fluorinated Surfaces; Langmuir 2004, 20, 10080-10085.

Cho, J.-D.; Kim, S.-G.; Hong, J.-W., Surface modification of polypropylene sheets by UV-radiation grafting polymerization, Journal of Applied Polymer Science 2006, 99, 1446-1461.

Selvam, P. et al; Copolymers of 4-(3',4'-Dimethoxycinnamoyl)Phenyl Acrylate and MMA: Synthesis, Characterization, Photocrosslinking Properties, and Monomer Reactivity Ratios; Journal of Macromolecular Science, Pure and Applied Chemistry; 2004; Part A; vol. 41; Issue 7; 791-809.

Vijayanand, P. S. et al.; Copolymerization of Benzoylphenyl Methacrylate with Methyl Methaceylate: Synthesis, Characterization and Determination of Monomer Reactivity Ratios; Journal of Macromolecular Science, Pure and Applied Chemistry; 2005; Part A; vol. 42; issue 5; 555-569.

Prucker, O. et al.; Photochemical Attachment of Polymer Films to Solid Surfaces Via Monolayers of Benzophenone Derivatives; Journal American Chem. Soc.; 1999; 121; 8766-8770.

Qiu, J.; Charleux, B.; Matyjaszewski, K.; Controlled/Living Radical Polymerization in Aqueous Media: Homogeneous and Heterogeneous Systems; Prog. Polym. Sci.; 2001; 26, 2083-2134.

Davis, K. A.; Matyjaszewski, K.; Statistical, Gradient, Block and Graft Copolymners by Controlled/Living Radical POlymerizations; Adv. Polym. Sci; 2002; vol. 159; 1-168.

Chiefari, J. et al.; Living Free-Radical Polymerization by Reversible Addition-Fragmentation Chain Transfer: The RAFT Process; Macromolecules; 1998; 31; 5559-5562.

McCormick, C.L. et al.; Aqueous RAFT Polymerization: Recent Developments in Synthesis of Functional Water-Soluble (Co)polymers with Controlled Structures; Accounts of Chemical Research; 2004; 37, 312-325.

Wang, Jin-Shan et al.; Controlled/"Living" Radical Polymerization. Atom Transfer Radical Polymerization in the Presence of Transition-Metal Complexes; Journal of American Chemical Society; 1995; vol. 117, 5614-5615.

Matyjaszewski, K.; Dong, H.; Jakubowski, W.; Pietrasik, J.; Kusumo, A.; Grafting from Surfaces for "Everyone": ARGET ATRP in the Presence of Air; Langmui; 2007; 23; 4528-4531.

Ma, Huimin et al.; A Novel Sequential Photoinduced Living Graft Polymerization; Macromolecules, 2000, Vo. 33, No. 2, pp. 331-335.

Kenawy, El-Refaie et al; The Chemistry and Applications of Antimicrobial Polymers: A State-of-the-Art Review; Biomacromolecules; 2007; vol. 8; No. 5; 1359-1384.

Brauchle, C.; et al.; Hydrogen Abstraction by Benzophenone Studied by Holographic Photochemistry; The Journal of Physical. Chemistry; 1981; vol. 85; No. 2; 123-127.

Horie, K.; et al.; Photochemistry in Polymer Solids. 3. Kinetics for Nonexponetial Decay of Benzophenone Phosphorescence in Acrylic and Methacrylic Polymers; Macromoleculas, 1984; 17; 1746-1750.

Horie, K.; et al.; Photochemistry in Polymer Solids. 8. Mechanism of Photoreaction of Benzophenone in Poly(vinyl alcohol); Macromoleculas; 1987; 20; 54-58.

Evans, B. W.; Scott, G; Mechanisms of Antioxidant Action: Polymer Grafted Antioxidants; European Polymer Journal; 1974; 10; 453-458.

PRIOR ART

PP CA = 103    PP with PDMAEMA CA = 72 °

Figure 4A
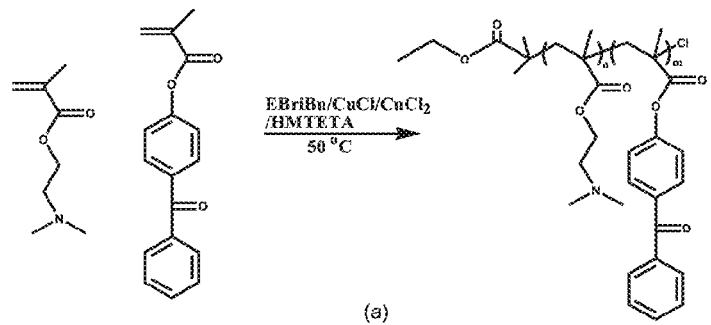
(a)
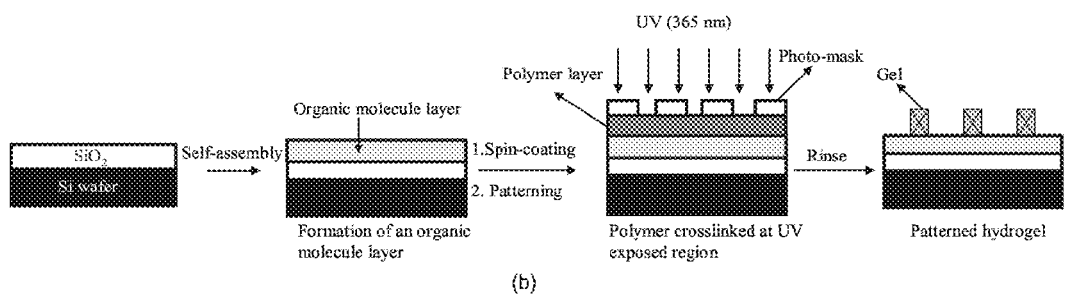
(b)
Figure 4B
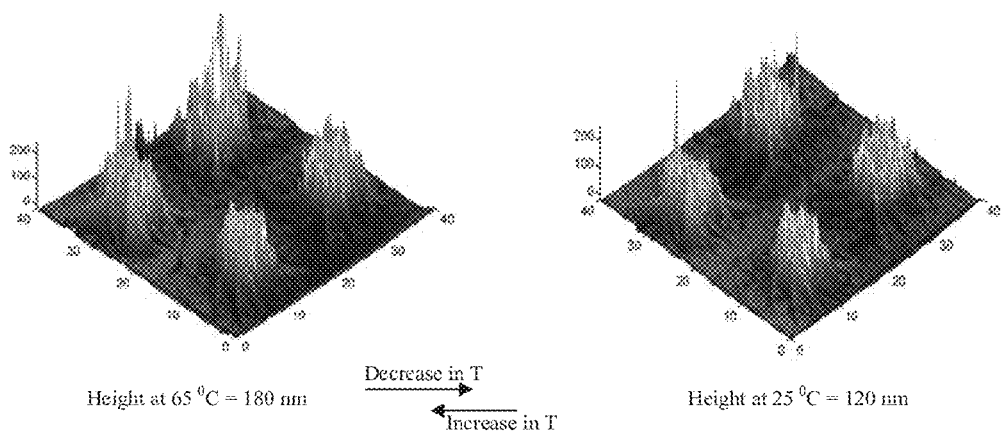
Height at 65 °C = 180 nm  ⟶ Decrease in T  ⟵ Increase in T  Height at 25 °C = 120 nm
Figure 4C Different architectures of a series of block copolymers tested for biocidal activity Challenge: $2.9 \times 10^5$ E Coli in 5 mL suspension, surface area 5 cm²

MODIFICATION OF SURFACES WITH POLYMERS

GOVERNMENTAL INTEREST

This invention was made with government support under grants CTS-0304568, CHE-0405627 and DMR-0549353 awarded by the National Science Foundation. The government has certain rights in this invention.

CROSS-REFERENCE TO RELATED APPLICATION

This application is a continuation patent application of U.S. patent application Ser. No. 13/734,747, filed Jan. 4, 2013, which is a divisional patent application of U.S. patent application Ser. No. 11/894,010, filed Aug. 17, 2007, now U.S. Pat. No. 8,349,410, issued on Jan. 8, 2013, which claims benefit of U.S. Provisional Patent Application Ser. No. 60/838,337, filed Aug. 17, 2006, the disclosures of which are incorporated herein by reference.

BACKGROUND OF THE INVENTION

The present invention relates to modification of surfaces with polymers and, particularly, to compositions, methods and systems for the modification of surfaces with polymers formed via controlled radical polymerization and for the modification of surfaces with molecules functionalized to initiate controlled radical polymerization.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

Most polymer materials are chemically inert and essentially hydrophobic (that is, they have a passive surface of low surface energy and high contact angle with water and other polar liquids). Therefore, such polymers require surface treatment, for example, to enhance low adsorption of dyes and inks, to overcome inherent low adhesion to coatings and other polymers, to achieve biocompatibility, to impart biocidal activity, or to decrease electrostatic charge effects. Various surface-modification techniques have been widely used in the industry to alter surface properties, including chemical reactions, corona discharge, flame and plasma treatments, and high-energy irradiation. However, most of these approaches require multiple (and often difficult or cumbersome) steps to provide desired functionalization. Moreover, site specific functionalization may be difficult or impossible using such methods.

Nonetheless, polymer surface modification has been a significant issue for many years and is one of the main approaches being studied to introduce new functionalities to existing polymeric materials and thereby improve their performance in practical applications. Indeed the surfaces of solid materials are frequently modified by attachment of polymer films to tailor the surface properties including, but not limited to, color, wettability, biocompatibility, adhesion, adsorption, corrosion resistance, friction etc. However, depending on the final application, different thicknesses of the enveloping polymer layers are targeted to modify the solid surface to attain the desired effect. Polymer films can, for example, be applied by depositing or spraying a polymeric coating from solution. However a robust coating resistant to abrasion and shock is not always attained.

Polymers with reactive groups have also been grafted onto surfaces, resulting in the formation of materials known as polymer brushes. In a number of cases of grafting polymer layers or films onto polymeric surfaces, photoinitiators have, for example, been used. For example, Decker, C. J. et al., Appi Polym Sci 1983, 28, 97 discloses grafting of an acrylate onto polyvinylchloride and polypropylene (PP) films by adding benzophenone as a separate component to the second coating polymer.

A similar two step approach was disclosed in Ruckert, D.; Geuskens, G., Surface modification of polymers, *European Polymer Journal* 1996, 32, 201-208. In that approach, a "grafting to" polymerization was initiated by a water soluble derivative of benzophenone, Quantacure BTC, which was used to initiate the grafting of acrylamide onto styrene-(ethylene-co-butene)-styrene block copolymer (SEBS).

Likewise, a similar procedure is also disclosed in Decker, C.; Zahouily, K., Surface modification of polyolefins by photografting of acrylic monomers, *Macromolecular Symposia* 1998, 129, 99-108, in which benzophenone was used as a photoinitiator to generate polymer radicals at the surface of the polyolefin film. The grafting reaction was carried out in an aqueous solution, or with the neat monomer, which was laminated between two PP films.

A procedure to tether a photoresponsive unit to a substrate was disclosed in Samuel, J. D. J. S.; Ruehe, J., A Facile Photochemical Surface Modification Technique for the Generation of Microstructured Fluorinated Surfaces; *Langmuir* 2004, 20, 10080-10085, in which, a photochemical process was used to allow fluoropolymers to be chemically bound at room temperature onto $SiO_2$ surfaces. A benzophenone silane difunctional molecule was used to form a self-assembled monolayer on the surface of the substrate, which was subsequently coated with the preformed fluoropolymer and irradiated with UV light of wavelength 365 nm. (FIG. 1) See also, Published PCT Patent Application No. WO 2005/083435.

Cho, J.-D.; Kim, S.-G.; Hong, J.-W., Surface modification of polypropylene sheets by UV-radiation grafting polymerization, *Journal of Applied Polymer Science* 2006, 99, 1446-1461 discloses grafting 1,6-hexanediol diacrylate (HDDA) onto polypropylene (PP) substrates in the presence of benzophenone (BP) and isopropylthioxanthone (ITX) photoinitiators. Subsequently, polyurethane acrylate formulations were coated onto the HDDA-g-PP substrates, using UV radiation.

There are a number of problems with such procedures. For example, one or more of the steps of such procedures may not be environmentally suitable for industrial use. The above-described approaches also require multi-stage procedures for incorporating polymers prepared by non-controlled or free radical polymerization procedures. Addition of multiple components, such as reactive thinner, binder, adhesion promoter, or added low molecular weight photoinitiator are often required in such processes. Further, such processes typically require careful control of reaction conditions and cannot, for example, occur in an open air environment. Moreover, the non-controlled polymerization processes result in formation of non-uniformly responsive surfaces that additionally provide a slow or incomplete response to further stimulation.

Indeed, the control of polymer compositions, architectures, and functionalities for the development of materials with a specific set of properties, such as biological properties, has long been of great interest in polymer chemistry. Atom Transfer Radical Polymerization (ATRP), nitroxide mediated polymerization (NMP), reversible addition fragmentation chain transfer (RAFT) and catalytic chain transfer (CCT) are examples of controlled/living radical polymerization processes (CRP) that provide a relatively new and versatile method for the synthesis of polymers from a broad spectrum of vinyl-monomers with controlled molecular weight, low polydispersity and site specific functionality. Indeed, since CRP processes provide compositionally homogeneous, well-defined polymers (with predictable molecular weight, narrow molecular weight distribution, and high degree of chain end-functionalization) they have been the subject of much study as reported in several review articles. See, for example, Matyjaszewski, K., Ed. Controlled Radical Polymerization; ACS: Washington, D.C., 1998; ACS Symposium Series 685. Matyjaszewski, K., Ed. Controlled/Living Radical Polymerization. Progress in ATRP, NMP, and RAFT; ACS: Washington, D.C., 2000; ACS Symposium Series 768. Matyjaszewski, K., Davis, T. P., Eds. Handbook of Radical Polymerization; Wiley: Hoboken, 2002. Qiu, J.; Charleux, B.; Matyjaszewski, K. Prog. Polym. Sci. 2001, 26, 2083. Davis, K. A.; Matyjaszewski, K. Adv. Polym. Sci. 2002, 159, 1.

CRP processes differ, for example, in the type of group being transferred. For example, ATRP polymerizations typically involve the transfer of halogen groups. NMP polymerizations generally involve the transfer of stable free radical groups, such as nitroxyl groups. Details concerning nitroxide mediated polymerizations are described in, for example, in Chapter 10 of The Handbook of Radical Polymerization, K. Matyjaszewski & T. Davis, Ed., John Wiley & Sons, Hoboken, 2002. RAFT processes, described by Chiefari et al. in Macromolecules, 1998, 31, 5559, differ from nitroxide-mediated polymerizations in that the group that transfers is, for instance, a thiocarbonylthio group, although many other groups have been demonstrated. See, for example, McCormick and Lowe, Accounts of Chemical Research, 2004, 37, 312-325.

ATRP is presently one of the most robust CRP and a large number of monomers can be polymerized providing compositionally homogeneous well-defined polymers having predictable molecular weights, narrow polydispersity, and high degree of end-functionalization. Matyjaszewski and coworkers disclosed ATRP, and a number of improvements in the basic ATRP process, in a number of patents and patent applications. See, for example, U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,627,314; 6,790,919; 7,019,082; 7,049,373; 7,064,166; 7,157,530 and U.S. patent application Ser. No. 09/534,827; PCT/US04/09905; PCT/US05/007264; PCT/US05/007265; PCT/US06/33152 and PCT/US2006/048656, the disclosures of which are herein incorporated by reference.

ATRP has been demonstrated to be a versatile technique for the synthesis of well-defined polymers, as well (co)polymers with complex architecture and organic/inorganic hybrid materials. ATRP has, for example, been investigated for the preparation of polymer brushes. The polymer chains of such brushes can be tethered to flat surfaces or curved surfaces, encompassing a range of composition and degree of polymerization (DP). Polymer brushes formed via ATRP can, for example, modify surface properties, prepare nano-pattern displays and/or allow design of stimuli-responsive materials. In a number of procedures for forming polymer brushes, an ATRP initiator is attached to a surface and the polymer chains are "grafted from" the surface.

A drawback of ATRP and other controlled radical polymerizations (CRP) used for polymer brush syntheses in "grafting from" approaches, lies in the inability of CRP techniques to prepare stable, thick polymer layers (for example, in the range of micrometers).

Although a number of advances have been made in the modification of surfaces with polymers, it remains desirable to develop improved compositions, methods and systems to modify surfaces with polymers, particularly wherein the physiochemical properties of the polymer are controlled.

SUMMARY OF THE INVENTION

In several embodiments, the present invention provides compositions, methods and systems to form functional or responsive surfaces with site specific tailorable, optionally uniform, properties using well defined polymers. A suitable polymer for tethering to a surface includes functional groups that interact or can be modified to interact directly with the substrate to tether the polymer to the surface. In several embodiments, the polymer to be tethered to the surface includes groups that are stimulated by, modified by, or react to photo-irradiation to induce radical formation. Such radicals can, for example, interact with the target surface or substrate to introduce a second functional group or a functional material to the surface, or a selected portion of the surface of the surface (which can, for example, be a polymeric surface). The tethered polymer can, for example, impart a wide variety of physiochemical characteristics to the surface and can, for example, include responsive functionality that responds to an external stimulus.

In one aspect, the present invention provides a polymer formed by controlled radical polymerization which includes groups that can be modified after controlled radical polymerization to form a radical. The polymer can, for example, be the reaction product of a controlled radical polymerization of radically polymerizable monomers, wherein at least one of the radically polymerizable monomers includes at least one group that can be modified after the controlled radical polymerization to form a radical.

The group can, for example, be modified by application of energy to the polymer to form a radical which can abstract a hydrogen. The energy used to modify the group to form a radical can, for example, be light energy. Other energy, such a thermal energy etc. can be used in connection with groups which can be stimulated or modified by such energy to form radicals.

The group that can be modified to form a radical can, for example, undergo a Norrish type I or Norrish type II reaction upon application of light energy. The group can, for example, be an aryl ketone group. The group can, for example, include one of the following groups, functionalities or radicals: benzophenone-, acetophenone-, benzyl-, benzoin-, hydroxyalkylphenone-, phenyl cyclohexyl ketone-, anthraquinone-, trimethyl-benzoylphosphine oxide-, methylthiophenyl morpholine ketone-, aminoketone-, azobenzoin-, thioxanthone-, hexaarylbisimidazole-, triazine-, or fluoroenone-. In several embodiment, the group includes a benzophenone group. The group can also, for example, be a vinylpyridinium N-oxide group.

The formed radical can, for example, be functional to undergo reaction with a second polymer to create a covalent bond between the polymer and the second polymer.

In one embodiment, the polymer and the second polymer are each grafted from a surface via controlled radical polymerization. The radical forming groups can thus be used to effect crosslinking between polymer chains grafted from a surface via controlled radical polymerization.

In several embodiment, the radical is functional to tethers the polymer to a surface. The radical can further be functional to crosslink the polymer. A function of the radical can, for example, be to tether the polymer to a surface and to crosslink the polymer. A response of a layer of the polymer to environmental conditions (external stimuli) can, for example, be controlled, at least in part, by controlling crosslink density. A response time of the polymer can, for example, be determined, at least in part, by the crosslinking density. For example, a thickness of a layer of the polymer tethered to the surface can be dependent upon at least one environmental condition (for example, temperature, pH etc.).

A thickness of a layer of the polymer which is tethered to the surface can, for example, be controlled (at least in part) by control of a concentration of the polymer in a solution of the polymer which is applied to the surface.

In several embodiments, the surface to which the polymers of the present invention can be tethered is a polymeric surface. The polymer surface can, for example, include radically abstractable protons. Tethering of the polymer to the surface can, for example, result in a more polar surface. The polymeric surface to which the polymers of the present invention can be tethered include, but are not limited to, a polyolefin, a polyester, polycarbonate, poly(methyl methacrylate), or polystyrene. The polymer of the present invention can also be tethered to synthetic and natural polymers.

The radically polymerizable monomers for the controlled radical polymerization can, for example, include at least one other monomer selected to effect a desired property on the surface. Surface properties which can be affected by the polymer include, but are not limited to, at least one of hydrophilicity, hydrophobicity, biocompatibility, bioactivity, adhesion, adsorption, corrosion resistance, abrasion resistance, temperature insulation, electrical insulation, impact resistance, hardness, softness (for example, to provide cushioning for improved ergonomics), swellability, or thermal responsiveness.

In several embodiments, the other monomer includes at least one biocidally active group or at least one precursor to a biocidally active group. The other monomer can include at least one group that can be converted to a quaternary salt, an electrolyte, a betaine, a sulfonate or a phosphonate. In several embodiment having biocidal activity, the at least one group of the other monomer is a quaternary salt or a precursor to a quaternary salt. The quaternary salt can, for example, be at least one of a quaternary ammonium salt and a quaternary phosphonium salt.

The other monomer can, for example, be 2-(dimethylamino)ethyl methacrylate (DMAEMA), 4-vinylpyridine, 2-vinylpyridine, N-substituted acrylamides, N-acryloyl pyrrolidine, N-acryloyl piperidine, acryl-L-amino acid amides, acrylonitriles, methacrylonitriles, vinyl acetates, 2-hydroxyethyl methacrylate, p-chloromethyl styrene, a derivative of such a monomer or a substituted variety of such a monomer. In that regard, the other monomer can include an amino group that can be converted, for example, to a quaternary salt by a process including reaction of the group with an alkyl halide.

The polymers of the present invention provide substantial advantage in that the group that can be modified to create a radical can be so modified in an open air atmosphere. The radicals created provide a facile procedure for tethering the polymers of the present invention to a surface (including, relatively inert surfaces as found with many polymeric materials) via covalent bonding. In a number of embodiments, the polymer is both crosslinked and tethered to the surface by simple exposure to light energy (for example, ultraviolet or UV energy).

Moreover, at least one of the molecular weight, molecular weight distribution or average number of monomers including the group that can be modified after the controlled radical polymerization (as well as properties of any other monomers) in the polymer can be readily controlled.

In several embodiments, the polymer is a block copolymer wherein a first segment includes the at least one group that can be modified after the controlled radical polymerization to form a radical, and a second segment imparts a predetermined physiochemical property to the surface. The second segment can for example, include a biocidal functionality or a precursor to a biocidal functionality.

In another aspect, the present invention provides an article including a surface modified by a polymer which is the reaction product of a controlled radical polymerization of radically polymerizable monomers. At least one of the radically polymerizable monomers includes at least one group that can be modified after the controlled radical polymerization to form a radical which is functional to tether the polymer to the surface.

In a further aspect, the present invention provides a method including synthesizing a polymer by effecting a controlled radical polymerization of radically polymerizable monomers. At least one of the radically polymerizable monomers includes at least one group that can be modified after the controlled radical polymerization to form a radical.

The at least one group can, for example, be modified by application of energy to the polymer to form a radical. The energy can, for example, be light energy. The group can, for example, undergoes a Norrish type I or Norrish type II reaction upon application of light energy.

The method can further include applying of the polymer to the surface prior to modification of the at least one group. The polymer can, for example, be applied to the surface in solution. The solution can be spin cast onto the surface. The solution can also, for example, be sprayed onto the surface. In several embodiments, light energy is applied to the solution to cause the at least one group to form a radical. As described above, the group can, for example, undergo a Norrish type I or Norrish type II reaction upon application of light energy.

In several embodiments, the group that can be modified after the controlled radical polymerization to form a radical is an aryl ketone group. The group can, for example, include one of the following groups, functionalities or radicals: benzophenone-, acetophenone-, benzyl-, benzoin-, hydroxyalkylphenone-, phenyl cyclohexyl ketone-, anthraquinone-, trimethyl-benzoylphosphine oxide-, methylthiophenyl morpholine ketone-, aminoketone-, azobenzoin-, thioxanthone-, hexaarylbisimidazole-, triazine-, or fluoroenone-.

As described above, the light (or other) energy can be applied to the solution in an open air environment. The light (or other) energy can be applied in a predetermined pattern to create a pattern of polymer tethered to the surface.

In another aspect, the present invention provides a compound including a first group that is stimulated upon application of energy to the molecule to tether the molecule to a surface or to another polymer chain and a second group comprising a controlled radical polymerization initiator functionality. The energy can, for example, be light energy and the first group is stimulated to form a radical.

The first group can, for example, undergo a Norrish type I or Norrish type II reaction upon application of light energy. The first group can, for example, be an aryl ketone group. The first group can, for example, include one of the following groups, functionalities or radicals: benzophenone-, acetophenone-, benzyl-, benzoin-, hydroxyalkylphenone-, phenyl cyclohexyl ketone-, anthraquinone-, trimethyl-benzoylphosphine oxide-, methylthiophenyl morpholine ketone-, aminoketone-, azobenzoin-, thioxanthone-, hexaarylbisimidazole-, triazine-, or fluoroenone-. In several embodiments, the first group includes a benzophenone group.

The compound can, for example, have the formula:

$$R_1—S—Y$$

wherein $R_1$ is the first group, which can be stimulated by light energy to form a radical, S is a spacer group (which can be present or absent) and Y is a controlled radical polymerization initiator functionality.

The initiator functionality can for example, be an ATRP imitator functionality. The ATRP initiator functionality can include one or more halogens or psedohalogens. The compound can, for example, have the formula:

$$(R_1—S—)(R_{11})(R_{12})C—X$$

wherein $R_1$ is the first group, which can be stimulated by light energy to form a radical, S is a spacer group (which can be present or absent), X is selected from the group consisting of Cl, Br, I, $OR_{10}$, $SR_{14}$, $SeR_{14}$, $OP(=O)R_{14}$, $OP(=O)(OR_{14})_2$, $OP(=O)OR_{14}$, $O—N(R_{14})_2$ and $S—C(=S)N(R_{14})_2$, where $R_{10}$ is alkyl of from 1 to 20 carbon atoms in which each of the hydrogen atoms may be independently replaced by halide, $R_{14}$ is aryl or a straight or branched $C_1$-$C_{20}$ alkyl group, and where an $N(R_{14})_2$ group is present, the two $R_{14}$ groups may be joined to form a 5- or 6-membered heterocyclic ring; and $R_{11}$, $R_{12}$ and $R_{13}$ are each independently selected from the group consisting of H, halogen, $C_1$-$C_{20}$ alkyl, $C_3$-$C_8$ cycloalkyl, $C(=Y)R_{15}$, $C(=Y)NR_{16}R_{17}$, COCl, OH, CN, $C_2$-$C_{20}$ alkenyl, $C_2$-$C_{20}$ alkynyl oxiranyl, glycidyl, aryl, heterocyclyl, aralkyl, aralkenyl, $C_1$-$C_6$ alkyl in which from 1 to all of the hydrogen atoms are replaced with halogen and $C_1$-$C_6$ alkyl substituted with from 1 to 3 substituents selected from the group consisting of $C_1$-$C_4$ alkoxy, aryl, heterocyclyl, $C(=Y)R_{15}$, $C(=Y)NR_{16}R_{17}$, oxiranyl and glycidyl; where $R_{15}$ is alkyl of from 1 to 20 carbon atoms, alkoxy of from 1 to 20 carbon atoms, aryloxy or heterocyclyloxy; and $R_{16}$ and $R_{17}$ are independently H or alkyl of from 1 to 20 carbon atoms, or $R_{16}$ and $R_{17}$ may be joined together to form an alkylene group of from 2 to 5 carbon atoms, thus forming a 3- to 6-membered ring; such that at least one of $R_{11}$ and $R_{12}$ is not H.

In another aspect, the present invention provides a method of preparing a surface for a grafting from controlled radical polymerization including placing a compound in contact with the surface and applying energy thereto. The compound includes a first group that is stimulated upon application of the energy to the molecule to tether the molecule to the surface. The compound further includes a second group including a controlled radical polymerization initiator functionality. As described above, the energy can be light energy and the first group is stimulated to form a radical.

The first group can, for example, undergo a Norrish type I or Norrish type II reaction upon application of light energy. The first group can, for example, be an aryl ketone group. In several embodiments, the first group includes one of the following groups, functionalities or radicals: benzophenone-, acetophenone-, benzyl-, benzoin-, hydroxyalkylphenone-, phenyl cyclohexyl ketone-, anthraquinone-, trimethyl-benzoylphosphine oxide-, methylthiophenyl morpholine ketone-, aminoketone-, azobenzoin-, thioxanthone-, hexaarylbisimidazole-, triazine-, or fluoroenone-. In a number of embodiments, the first group includes a benzophenone group.

The initiator functionality can, for example, be an ATRP imitator functionality. The ATRP initiator functionality can include one or more halogens or psedohalogens.

Energy can, for example, be applied in a predetermined pattern to create a pattern of the molecule tethered to the surface.

In a further embodiment, the present invention provides a polymer which is the reaction product of a controlled radical polymerization of radically polymerizable monomers, wherein at least one of the radically polymerizable monomers includes at least one group that can be modified after the controlled radical polymerization to effect tethering of the polymer to a surface.

In still a further embodiment, the present invention provides a block copolymer including at least a first segment to impart a predetermined functionality to a target surface and at least a second segment including functional groups to interact with the targeted surface to attach the block copolymer to the surface. In several embodiments, the first segment is free of functional groups that interact with the surface to attach the block copolymer to the surface.

The first segment can, for example, be selected to affect at least one of hydrophilicity, hydrophobicity, biocompatibility, bioactivity, adhesion, adsorption, corrosion resistance, abrasion resistance, temperature insulation, electrical insulation, impact resistance, hardness, softness, swellability, or thermal responsiveness of the target surface.

One segment can, for example, include at least one group that can be modified after the controlled radical polymerization to form a radical. One or more segments can, for example, include poly(3-(trimethoxysilyl)propyl methacrylate).

One or more segments can, for example, include quaternary ammonium salt groups or quaternary phosphonium salt groups.

In several embodiments, the block copolymer is formed via a controlled radical polymerization.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 4A illustrates a synthetic pathway for the preparation of poly(DMAEMA-stat-BPMA) copolymers of the present invention via ATRP.

FIG. 4B illustrates a schematic representation of a hydrogel patterning process of the present invention.

FIG. 4C illustrates reversible swelling and collapsing behavior of a thermoresponsive gel of the present invention.

DETAILED DESCRIPTION OF THE INVENTION

Figure 1:
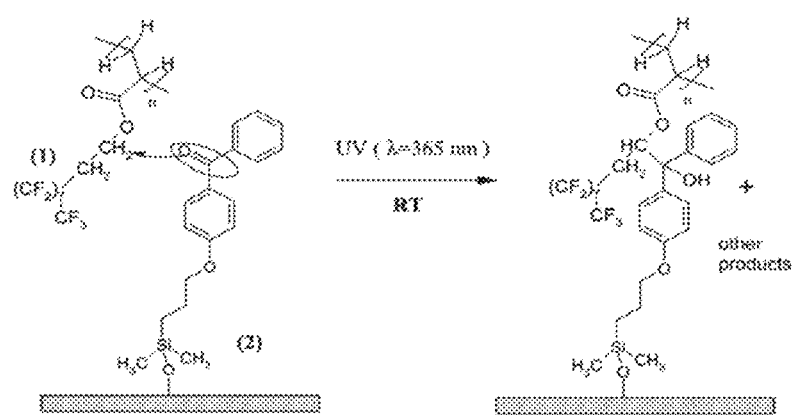
FIG. 1 illustrates a schematic depiction of a prior art photochemical attachment of fluoropolymers (1) to a surface-anchored benzophenone (2).

As set forth above, in several embodiments, the present invention provides polymers which are the reaction product of radically polymerizable monomers. At least one of the radically polymerizable monomers includes at least one group that can be stimulated or modified after the controlled radical polymerization to, for example, effect tethering of the polymer to a surface and/or effect crosslinking. The monomers are polymerized via a controlled radical polymerization such that, for example, the monomer including the modifiable group is incorporated into the backbone of the polymer. In the representative examples set forth below the group is modified to create a radical by the application of energy thereto (for example, light energy).

As used herein and in the appended claims, the singular forms "a," "an", and "the" include plural references unless the content clearly dictates otherwise.

As used herein, the term "polymer" refers to a compound having multiple repeat units (or monomer units) and includes copolymers (including two, three, four or more monomer repeat units). Likewise, related terms such as "polymerization" and "polymerizable" include "copolymerization" and "copolymerizable".

The term "ATRP" refers to a living/controlled radical polymerization described by Matyjaszewski in the Journal of American Chemical Society, vol. 117, page 5614 (1995), as well as in ACS Symposium Series 768, and Handbook of Radical Polymerization, Wiley: Hoboken 2002, Matyjaszewski, K and Davis, T, editors, the disclosures of which are hereby incorporated by reference. Other researchers have referred to the same procedure as transition metal mediated living radical polymerization (TMM LRP) and the initiation process as homolytic cleavage of the added initiator, but the procedures proceed with in the presence of the same components irrespective of nomenclature.

An "ATRP initiator" is a chemical molecule, with one or more transferable halogen or pseudohalogens that can initiate chain growth. Fast initiation is desired if one wants to obtain well-defined polymers with low polydispersities, a slower rate of initiation provides a polymer with a broader molecular weight distribution. In some instances broader molecular weight distribution is not a limitation on the utility of the product. A variety of initiators, typically alkyl halides, have been used successfully in ATRP. As known in the art, many different types of halogenated compounds are potential initiators.

The terms "biocidal," "biocidally active" and "antimicrobial" refer to a compound or material with the ability to inhibit the growth of, inhibit the reproduction of, or kill microorganisms: such as, without limitation, spores and bacteria, fungi, mildew, mold, and algae.

In several embodiments, the surfaces to which the polymers of the present invention can be tethered can have inherent functionality. Alternatively, the surface can be converted to have attached functionality, which are groups that can be employed to interact with a polymer chain to be deposited on the surface by a grafting to reaction. Examples of surfaces to which polymers of the present invention can be tethered include, but are not limited to, plain glass, amino glass, steel, paper, wood, wool, cotton surfaces comprising cellulosic materials, and any type of polymer surface, including surfaces of articles formed from thermoplastic or thermoset materials. Many other surfaces are possible. In general, the surfaces are in a solid state at the use temperature. However a liquid surface could be employed if one wished to prepare a free standing film of the crosslinked polymer with the functional surface exposed on each surface.

In a number of embodiments, the present invention provides functional materials (such as functional surfaces having biocidal functionality) provided by polymers having functionally active groups tethered to the surface (for example, biocidal groups such as quaternary ammonium salts and/or quaternary phosphonium salts). As set forth above, in several embodiments, the preparation of such materials is exemplified by the attachment of the polymers to the surface. In several other embodiments, the present invention provides an expedient process for the attachment of initiators for preparation of polymers tethered to a surface.

A preferred approach to preparing polymers with controllable distributed functionalities and uniform structure is by living/controlled polymerizations (LCP). Exemplary controlled polymerizations are polymerizations where chain breaking reactions such as transfer and termination may be minimized if desired to enable control of various parameters of macromolecular structure, such as molecular weight, polydispersity and terminal functionalities. Living/controlled radical polymerizations (CRP) typically, but not necessarily, include a low stationary concentration of radicals in equilibrium with various dormant species. While ATRP is used as a representative CRP in the examples and most of the discussion herein, other CRP processes can also be employed to prepare similar materials.

Because of the compatibility of atom transfer radical polymerization (ATRP) with a wide range of functional monomers, ATRP has been demonstrated to be a versatile technique for the synthesis of well-defined polymers, as well (co)polymers with complex architecture and organic/inorganic hybrid materials. As disclosed herein, ATRP has been investigated for the preparation of polymer brushes, that is polymer chains tethered to a solid substrate (either a flat surface or a curved surface) encompassing a range of compositions and degrees of polymerization (DP) that can modify surface properties, prepare nano-pattern displays and allow design of stimuli-responsive materials. ATRP was chosen for several representative polymerizations of the present invention because of its proven versatility.

In the context of the present invention, the term "controlled" refers to the ability to produce a polymer product having one or more physiochemical properties which are reasonably close to their predicted value (presuming high, or consistent, initiator efficiency). For example, if one assumes 100% initiator efficiency, the molar ratio of monomer to initiator leads to a particular predicted molecular weight. Some of the aspects of polymers that are "controlled" are described in greater detail in U.S. Pat. No. 6,624,262, the disclosure of which is incorporated herein by reference.

Similarly, one can "control" polydispersity by ensuring that the rate of deactivation is the same or greater than the initial rate of propagation. However, the importance of the relative deactivation/propagation rates decreases proportionally with increasing polymer chain length and/or increasing predicted molecular weight or degree of polymerization. Controlled radical polymerizations as used in the present invention can produce polymers that have narrow molecular weight distributions, or polydispersities, such as less than or equal to 3, or in certain embodiments less than or equal to 2.0 or less than or equal to 1.5. In certain embodiments, polydispersities of less than 1.2 may be achieved.

In several representative embodiments of the present invention, biocidally active surfaces are prepared. In a number of such embodiments of the present invention, the surface includes attached or tethered biocidal polymers (for example, including biocidal groups such as pendant quaternary ammonium or quaternary phosphonium salts). Surfaces modified with biocidal polymers inhibit the growth of microorganisms, such as, bacteria, including Gram positive and Gram negative bacteria, fungi, mildew, mold, and algae.

For example, one process for preparation of functional polymer modified surfaces of the present invention includes incorporating monomers into a controlled radical polymerization to form a polymer which can be attached to the surface. At least a portion of the monomers in the copolymer include a biocidally active group or a precursor of a biocidally active group.

A number of biocidally active agents can be incorporated into the biocidal surface agents of the present invention. Classes of known biocidal agents include, for example, quaternary cation-containing polymers (for example, polyquaternary ammonium ion-containing or phosphonium ion-containing polymers), chloramines and porphyrin derivatives.

Chloramines are renewable bleaches that can oxidize and kill. Chloramines not only kill, but also release oxidants that disrupt bacteria, spores and, potentially more importantly, the debris that is released from destroyed cells. The chloramines-induced degradation of cell and spore debris can thereby induce self-renewal of surface immobilized materials of the present invention.

In addition to the above surface-active biocides, singlet delta oxygen (SDO) generating organic compounds can be incorporated within the matrix of the biocidal surface agents of the present invention. SDO can oxidize the biologicals (and contaminants) in a similar, but less aggressive manner, as $TiO_2$. SDO generators are already proven biocides. In the case of, for example, chloramines and porphyrin one can expect to kill spores and/or microbes and then degrade the debris.

In several embodiments, the polymers are prepared by a controlled radical polymerization of radically polymerizable monomers including a first monomer having a biocidally active group or the precursor of a biocidally active group as described above. At least a second monomer includes at least one group that can be employed after polymerization to attach or tether the polymer to the surface. In the case that at least a portion of the monomers include a precursor capable of being converted to a biocidally active group, the monomers may be reacted with an activating compound to provide the biocidally active group either prior to, or after, tethering the copolymer to the selected surface. In general, the second monomer includes at least one group or functionality that can be modified after the controlled radical polymerization to effect tethering of the polymer to the surface. In several representative embodiments discussed herein, such second monomers include groups that form a radical upon application of energy such as light energy to the polymer. For example, the polymers of the present invention can include photoesponsive or photoinitiator functional groups including, but not limited to, aryl ketones (such as benzophenones, xanthones or thioxanthones, anthraquinones, fluorenones, benzils etc.) or 4-vinylpyridine N-oxide, which form radicals, or similar reactive species, upon application of light energy.

In further embodiments, additional or alternative functional groups on the polymer can include, for example, hydrophilic or hydrophobic monomers selected to provide a final surface, after attachment of the polymer, suitable for interaction with further deposited materials (such as paints or printing inks) or to provide a surface adapted to repel contaminants. Indeed, monomers used in the polymers of the present invention can be chosen to affect one or more of a wide variety of surface properties. For example, such properties include, but are not limited to, at least one of hydrophilicity, hydrophobicity, biocompatibility, bioactivity, adhesion, adsorption, corrosion resistance, abrasion resistance, temperature insulation, electrical insulation, impact resistance, hardness, softness (for example, to provide cushioning for improved ergonomics), swellability, or thermal responsiveness.

Many monomers have been successfully polymerized by CRP. See, for example, Matyjaszewski, K., Davis, T. P., Eds. Handbook of Radical Polymerization; Wiley: New York, 2002. All such monomers and generally any other radically polymerizable monomers are suitable for use in the present invention. The resultant polymers of the present invention can, for example, be homopolymers, copolymers including random, statistical and gradient copolymers, block polymers, graft polymers, linear polymers, branched polymers, dendritic polymers, comb shaped polymers, star polymers, as well as any other polymeric structure. The selected functionally active groups (for example, that form functional surfaces with tailorable phobicity, include biocidally active groups etc.) may be incorporated into the entire backbone in any desired distribution, in a single block, in multiple separate blocks, in grafts, in multiple grafts or in branches of the homopolymers or copolymers of the present invention or in more than one part of the polymer.

Stimuli responsive materials have become a subject of increasing interest as a consequence of the broad spectrum of potential applications. Simply by changing the composition of the polymer brush, the materials can respond to a variety of external stimuli such as temperature, electric or magnetic field, light or pH. In several representative embodiments of the present invention, stimuli responsive materials including monomer units having, for example, a thermo-responsive functional group were formed. In such representative embodiments, the thermo-responsive functional groups could be converted into biocidal functional groups. This approach was taken for efficiency and to exemplify the broad scope of the present invention in forming a variety of surface functionalizations. Once skilled in the art appreciates that the methods of the present invention can be used to synthesize a wide range of stimuli responsive polymers and/or polymers of varying physiochemical characteristics for tethering to a wide variety of surfaces.

Once again, a drawback of ATRP and other controlled radical polymerizations used for polymer brush syntheses in, for example, "grafting from" approaches has been the inability of CRP techniques to prepare relatively thick polymer layers. This and other problems with current CRP methodologies are addressed in the present invention by, for example, incorporation of one or more functional groups into the polymers of the present invention that enable formation of a stable tethered film of generally any thickness on a target surface. In that regard, such polymer films are stabilized via crosslinking of such functional groups after controlled radical polymerization. The resultant stabilized polymer, for example, exhibits increased modulus and increased ability to withstand forces experienced in use of the surfaces/articles to which such polymers may be tethered.

As discussed above, in several embodiments of the present invention, functionality incorporated into attachable copolymers is provided by monomers comprising precursors of biocidally active groups including monomers such as 2-(dimethylamino)ethyl methacrylate (DMAEMA), 4-vinyl pyridine, 2-vinyl pyridine, N-substituted acrylamides, N-acryloyl pyrrolidine, N-acryloyl piperidine, acryl-L-amino acid amides, acrylonitriles, methacrylonitriles vinyl acetates, 2-hydroxy ethyl methacrylate, p-chloromethyl styrene, and derivatives and substituted varieties of such monomers. Polymers comprising these monomeric compounds can easily be converted to chemical forms with known anitmicrobial activity including the facile conversion of DMAEMA, and similar monomer units including amine substituents, to a corresponding series of quaternary amines. For example, ATRP can be used as a robust mechanism for growing long chain, low polydispersity polymers that can be attached to, for example, filter paper, polypropylene, glass slides or many other surfaces using DMAEMA as a monomer. The tertiary amino group of the DMAEMA, which is pendant to the main chain of the polymer, is easily quarternized by different chain lengths of alkyl halides to provide an effective biocidal functionality. In that regard, the amino groups on DMAEMA and other such monomers can be converted to a quaternary salt by a process including reacting the group with an alkyl halide. In a number of embodiments, the alkyl halide may be any one of $C_1$-$C_{20}$ alkyl halide (such as, but not limited to, methyl chloride, methyl iodide, methyl bromide, ethyl bromide, butyl bromide, pentyl bromide, hexyl bromide, heptyl bromide, octyl bromide, nonyl bromide, decyl bromide, undecyl bromide, dodecyl bromide, tridecyl bromide, tetradecyl bromide, heptadecyl bromide, or hexadecyl bromide). The halide of the alkyl halide may be either one of fluorine, chlorine, bromine, and iodine.

Monomeric units suitable to impart biocidal activity can, for example, include at least one monomeric unit selected from the following formulae:

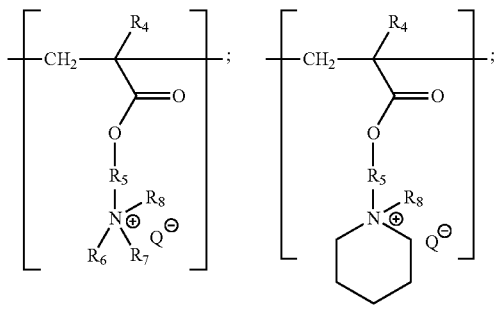

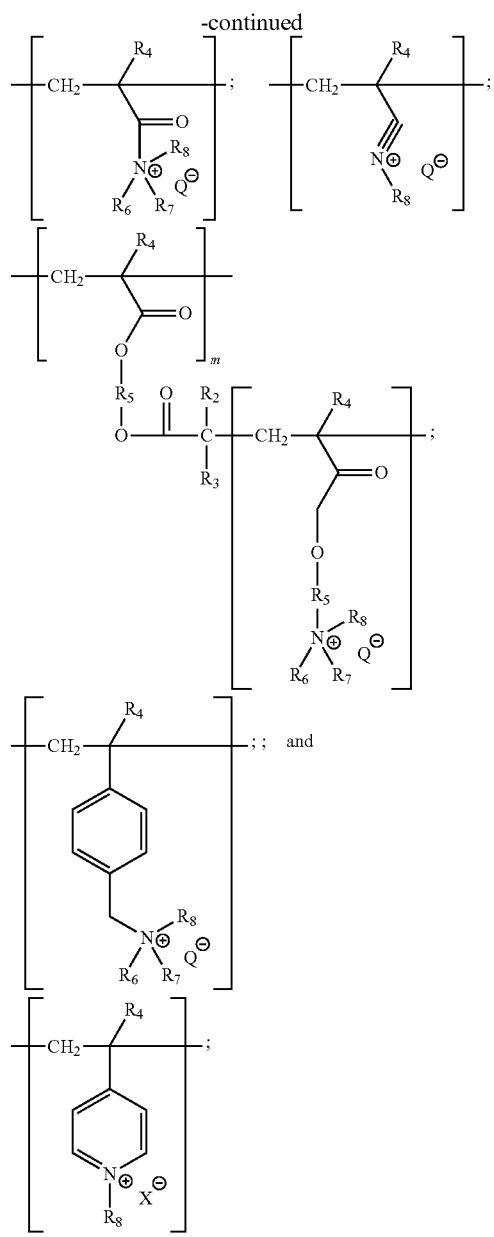

wherein $R_2$ and $R_3$ are, independently, one of H, $CH_3$, $OOCC_2H_5$ or CN; $R_4$ is one of H, $CH_3$, Cl or CN, $R_5$ is —$(CH_2)_n$— and —$CH_2C(CH_3)_2CH_2$—, n is from 1 to 6, $R_6$ and $R_7$ are, independently, one of alkyl $C_1$-$C_5$ or isopropyl, $R_8$ is H, alkyl $C_1$-$C_{16}$ and benzyl and Q is one of F, Cl, Br, I, $CF_3SO_3$ and $CF_3CO_2$, individually or in any combination each, X is a radically transferable atom or group or a group derived from the radically transferable atom or group, such as an additional polymer block, a hydroxy group, H, branched or straight chain alkyl or cyclic, and Q is one of F, Cl, Br, I, $CF_3SO_3$ and $CF_3CO_2$. See, for example, U.S. Patent Application Publication No. 2007/0122441, the disclosure of which is incorporated herein by reference.

As discussed above, in several such embodiments, functionalization of surfaces and/or crosslinking can be effected via comonomer units including, for example, aryl ketone functionality, which are incorporated into a polymer/copolymer during a CRP. Surfaces can be coated with these polymers and the surface film can be tethered to the substrate (as well as crosslinked/stabilized) by exposure to light. The tethered polymeric materials can possess additional inherently useful functionality. For example, the tethered polymer can display of a lower critical solution temperature (LCST), exemplified by a poly(dimethylaminoethyl methacrylate) copolymer. The tethered polymer can further be modified to provide additional or alternative functionality. For example, representative examples of bioresponsive surface are provided by quaternization of poly(dimethylaminoethyl methacrylate) copolymers to form a biocidal surface.

Schematic 1 below illustrates a proposed mechanism for the modification/reaction of representative aryl ketones such as benzophenone, xanthone or 9-fluorenone upon exposure to UV irradiation when the benzophenone molecule is in contact with a polymeric substrate. Without limitation to any mechanism, irradiation of benzophenone forms a biradical which can abstract a hydrogen (H) atom from a neighboring molecule, such as the substrate, forming a radical which then couples with the benzophenone residue.

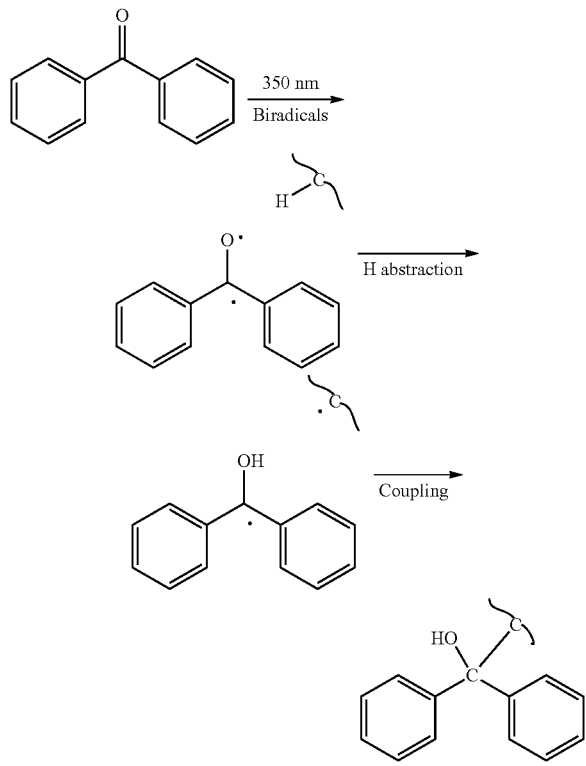

The mechanism is believed to occur through absorption of UV light at a wavelength of around 365 nm which triggers an n–π* transition in the carbonyl functionality of the benzophenone (or other aryl ketone) resulting in the formation of a biradicaloid triplet excited state which then abstracts a hydrogen atom from, for example, a polymer segment in close proximity, which results in the formation of a benzophenone ketyl radical and polymer radical. These radicals can recombine in the monolayer to form stable carbon-carbon bonds. Other photo-active substituted benzophenene molecules units have also been examined to enhance the efficiency of this radical forming abstraction reaction.

Benzophenone was used as an exemplary photoreactive moiety in several representative examples of the present invention. Benzophenone is readily available and capable of photochemical excitation with the initial formation of an excited singlet state that undergoes intersystem crossing to the triplet state. As discussed above, the excited triplet state can insert into carbon-hydrogen bonds by abstraction of a hydrogen atom (from a support surface, for example), thereby creating a radical pair. Subsequent collapse of the radical pair leads to formation of a new carbon-carbon bond. If a reactive bond (e.g., carbon-hydrogen) is not available for bonding, the ultraviolet light-induced excitation of the benzophenone group is reversible and the molecule returns to ground state energy level upon removal of the energy source. Indeed many photoactivatible aryl ketones such as benzophenone, acetophenone, isopropylthioxanthone (ITX), 1-Hydroxy-cyclohexyl-phenyl ketone (HCPK) (the formulas of which are set forth below) and substituted derivatives thereof are capable of multiple reactivation procedures.

Photoinitiators

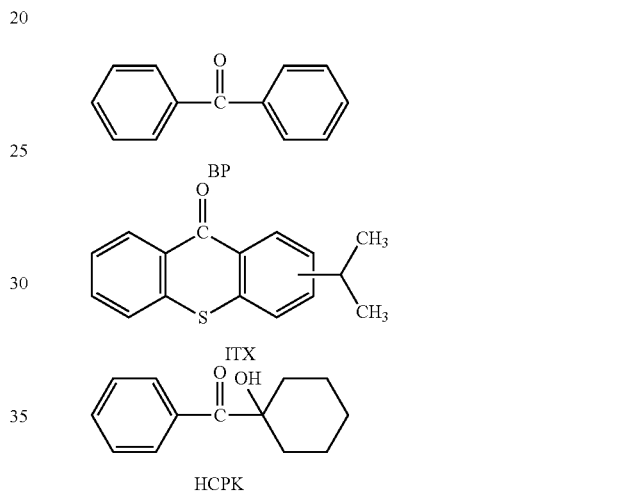

In several representative embodiments, a versatile surface "grafting to" method is described wherein a copolymer including an attached benzophenone functional group incorporated into the film forming polymer coating material which is covalently attached to a polymer surface or substrate (for example, polypropylene) after UV irradiation from the exterior of the polymer article (that is, through the coating and not through the polymer substrate—thereby demonstrating that opaque materials, such as glass filled polymers, can be coated using the disclosed materials).

In general, any hydrogen abstractor photoinitiator (for example, those which undergo a Norrish type I or II reaction) is a suitable functionality for incorporation into a monomer unit that can thereafter undergo radical polymerization in the mode exemplified herein by controlled copolymerization of benzophenone methacrylate (BPMA) with a range of radically copolymerizable monomers. Different copolymers were successfully introduced to polymer surfaces (for example, a polypropylene surface), which endowed the polymer with different surface properties (for example, enabling interaction with a subsequently deposited material such as paint or a printing ink to provide a suitable robust surface).

Photoinitiators suitable for use in the present invention (including those of the Norrish I or Norrish II type) can, for example, include the following radicals: benzophenone-ac-etophenone-, benzyl-, benzoin-, hydroxyalkylphenone-, phenyl cyclohexyl ketone-, anthraquinone-, trimethyl-benzoylphosphine oxide-, methylthiophenyl morpholine ketone-, aminoketone-, azobenzoin-, thioxanthone-, hexaarylbisimidazole-, triazine-, or fluoroenone. Such radicals can, for example, be substituted by one or more halogen atoms and/or by one or more alkyloxy groups and/or by one or more amino groups or hydroxyl groups. A representative overview of photoinitiators is given by Fouassier; "Photoinitiation, Photopolymerization and Photocuring: Fundamentals and Applications", Hanser-Verlag, Munich 1995, the disclosure of which is incorporated herein by reference. Further details of photoinitiators are provided in Carroy et al. in "Chemistry and Technology of UV and EB Formulation for Coatings, Inks and Paints", Oldring (ed.), 1994, SITA, London, the disclosure of which is incorporated herein by reference.

Use of CRP for the preparation of polymers including photoresponsive functionality such as aryl ketone functionality enables control of, for example, the molecular weight and average number of aryl ketone (and/or other photoresponsive) units in each polymer chain.

The present invention can thus provide a direct procedure for surface modification by a direct external UV-radiation "grafting to" reaction wherein the polymer tethered to the surface exhibits, for example, one or more of the following attributes: controlled topology, predetermined molecular weight and/or molecular weight distribution with a known average number of pre-selected distributed photo-responsive monomer units. As described above, the tethered polymers can further include monomer units providing one or more desired surface functionalities or physiochemical characteristics and/or one or more desired surface responses to the environment/stimuli.

As polymer surfaces are a dominant surface encountered in the everyday world, it is very desirable to design a simple direct method to introduce functional materials onto a polymer surface. The methods of the present invention introducing functional materials to surfaces (including polymeric surfaces) are particularly desirable in that the tethering reaction can be conducted in an open atmosphere. The functional polymers can be introduced to the surfaces of ordinary commercial synthetic polymers, namely polyolefins, polyamides, polyurethanes, polyesters etc. Such synthetic polymers exhibit either no or little inherent adhesion activity to deposited coatings or inks. Further, such polymer surfaces do not exhibit inherent bioresponsive functionality. Introduction of such functionality (and/or other non-inherent functionality) to a surface increases the utility of the material.

In several methods of the present invention, a functional surface is constructed without a separate surface modification step. The deposited functional polymer is directly and permanently attached/tethered to the surface, which can, for example, occur in an open air atmosphere. A thin surface film can, for example, be applied to a surface by spin coating a solution of the reactive polymer onto the surface and then stimulating the reactive functional groups. Spin coating is used in several representative examples of the present invention.

Alternatively, the surface can be coated by spraying a solution of the polymer onto the surface, and then attaching the material by stimulating the activatable or modifiable units (for example, photoresponsive units). This technique is demonstrated herein for example, by direct deposition of a solution of a reactive copolymer on a glass surface and tethering the polymer to the surface by simple exposure to light.

Polypropylene (PP) was used in several representative embodiments of the present invention to exemplify the range of high volume low cost thermoplastic and other polymer surfaces to which polymers of the present invention can be tethered to modify surface properties. PP represents a range of thermoplastic polymers with a useful spectrum of properties used in a wide variety of applications, including, but not limited to, food packaging, textile applications, automotive components, and biomedical materials. One skilled in the art appreciates that the polymers of the present invention can be tethered to a wide variety of surfaces and that PP is used in several representative examples as a non-limiting, exemplary polymeric substrate. The low surface energy and absence of functional groups in commodity PP resins are desirable for many major applications but cause problems in other applications which can preclude the use of PP in such applications or can add cost to the final product as a consequence of having to modify the surface. For example, surface treatment of PP articles is often required to achieve satisfactory adhesion prior to coating, painting, printing, metallization, etc. In many applications, such as beverage bottles, a second stretch molded film (for example, one that can display a message regarding contents of the container) is used to encapsulate the article. This can be avoided by using the present invention.

Indeed, many polymers, including, but not limited to, cotton, polyester, polycarbonate and poly(methyl methacrylate), are essentially inert to interaction with, for example, a second polymer film deposited on the surface. As noted above, this surface characteristic poses problems when one desires to paint or print directly onto the first polymer surface (for example, in applications such as panels for automotive bodies) since the desired strong coherent surface film resistant to abrasion or minor impact is not formed unless the coating material is chemically bound to the surface. A strong coherent surface is also required for bioresponsive materials where uniform surface properties are required over extended time frames.

A significant amount of work has been devoted to surface modification of PP and other materials by chemical treatment including deposition of $SiO_2$ layers, discharge plasma, ozone, and irradiation in the presence of functional low molecular weight molecules to attach those molecules to the surface. Such processes can be time-consuming and complicated. In addition, systems with $SiO_2$ as the anchoring layer are not stable, because the $SiO_2$ layer is only physically attached to the surface. Such techniques all involve treatment of the surface to create active sites which facilitates further surface modification such as interaction with an added film. Surface initiated polymerization from the attached active site or its derivatives has attracted great interest since it enables introduction of various functionalities to the surface by simply changing the polymerizable monomer. However, prior to the present invention, conventional radical polymerization has been utilized for such "grafting from" approaches, which does not produce uniform molecular structures with uniform distribution of functionality.

In several embodiments, the present invention provides efficient methods for simple modification of a surface (including PP and other similarly "inert" polymeric surfaces) to present a "polymer" surface to the environment in a subsequent "grafting onto" reaction in which one or more polymer surface properties are controlled.

Many of the representative, non-limiting examples discussed herein incorporate 2,2-dimethylaminoethyl methacrylate (DMAEMA) as a radically copolymerizable monomer. As discussed above, (co)polymers prepared from this monomer can display two interesting responses when deposited on a surface; 1) a direct thermo-response or 2) a biocidal response after quaternization. The selection of 2,2-dimethylaminoethyl methacrylate (DMAEMA) as an exemplary monomer unit was therefore made to demonstrate broad utility and functionality. Once again, any radically copolymerizable monomer can be used in a controlled radical copolymerization as detailed herein as well as in the incorporated references to obtain a functional surface desired for any subsequent targeted application.

Comonomers can, for example, be selected using selection criteria dependent upon desired properties, as known to those skilled in the art, to impart such desired properties to the modified surface. The tethered coating material can, for example, be formulated to modify physical properties of the surface. Modification of physical properties of surfaces is currently provided in commercial applications by, for example, overmolding. For example, in soft touch overmolding, a soft skin layer in overmolded on top of a rigid, hard engineering thermoplastic. Overmolding requires two-component molding which utilizes equipment containing two independent injection units, each injecting a different material. That type of setup typically involves two independent runner systems with a rotating mold. In certain applications, surface modification methods of the present invention obviate the need for such complex and expensive overmolding systems. In the methods of the present invention, a functional polymer film can be applied in a separate application and is tethered and/or stabilized by simple exposure to light at any convenient time and place.

The methods of the present invention can, for example, be applied to attach materials such as "supersoft" elastomers described in U.S. Pat. No. 7,019,082 to surfaces such as flat or curved surfaces of fibers or films, thereby providing a stable ultrasoft feel to solid surfaces (targeting, for example, cushions, fabrics, squeezables including handles for tools, mattresses, and toys).

As described further below, in-situ crosslinking/tethering surface modification (provided by photoresponsive or photoinitiator moieties in the polymer) can be used to modify the modulus of the now tethered polymer film by forming a continuous network or as a procedure reducing tack if the material is being employed as an adhesive.

The methods of the present invention can, for example, be employed to stabilize a blend of the first copolymer including a photo-crosslinkable unit with a second polymer added to modify the bulk properties of the blend, expediting application while at the same time resulting in the formation of an intra-material crosslinked alloy with the desired properties. For example, a block copolymer surfactant can readily be formulated with photo-responsive crosslinking functionality in each block to provide an alloy that can be stabilized by tethering the surfactant to both phases of the blend.

In another example, an ABA block copolymer with a small amount of pohotoinitiator (for example, benzophenone) in the A-block can be formed. The thermoplastic material can be fabricated. The A-blocks can be subsequently crosslinked upon application of light energy, thereby providing a thermally stable elastomeric material with out any sacrifice of B-block properties. This approach also works in adhesives since dispersed phase separated small A-block domains provide the equivalent of very high molecular weight B-block polymer.

DISCUSSION OF THE EXAMPLES

The concepts of the present invention were extended to form functional surfaces using two complementary strategies. In a first strategy, as discussed above, a radically (co) polymerizable monomer with a photo-active benzophenone functionality (Schematic 2) was prepared, and this monomer was copolymerized by a controlled polymerization process with other radically (co)polymerizable monomers to form random, statistical or gradient copolymers; or by sequential copolymerization block copolymers.

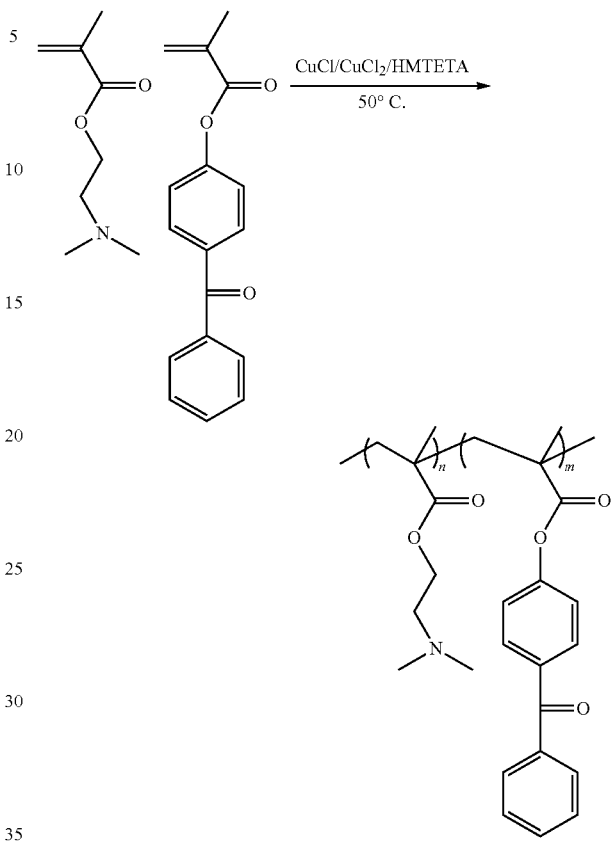

Schematic 2: Copolymerization of benzophenone methacrylate with DMAEMA

Other functional monomers such as such as 4-acryloyloxyphenyl-3-chlorostyryl ketone and 4-(3',4'-Dimethoxycinnamoyl)phenyl acrylate (originally disclosed for use in standard free radical copolymerization reactions) are also be suitable for ATRP.

In addition to linear polymers, polymers with other topologies as, for example, disclosed in other patents and patent applications describing ATRP can also be prepared if desired.

In several embodiments of surface modification, changes in the chemical composition of the treated surface was determined by ATR-FTIR. The surface property change after surface modification was, for example, illustrated by water contact angle measurement.

In a second strategy, a bi-functional molecule was synthesized wherein one functionality was available to react with the substrate while the other functionality was available to initiate a controlled polymerization process in a subsequent grafting from step. Schematic 3 below illustrates such a procedure wherein the bi-functional molecule included a photo-responsive functionality (represented by a benzophenone group) which is linked to an ATRP initiator functionality (represented by a bromoisobutyrate group). The exemplary molecule was attached to a polymeric substrate by irradiating a thin film of a molecule comprising a photo-sensitive functionality and an initiating functionality thereby tethering the ATRP initiating functionality to the first non-functional substrate. This approach enables control over both graft density and distribution of grafting from sites across any surface. A pattern can, for example, be imposed on the surface by photoselective tethering of the CRP initiating functionality.

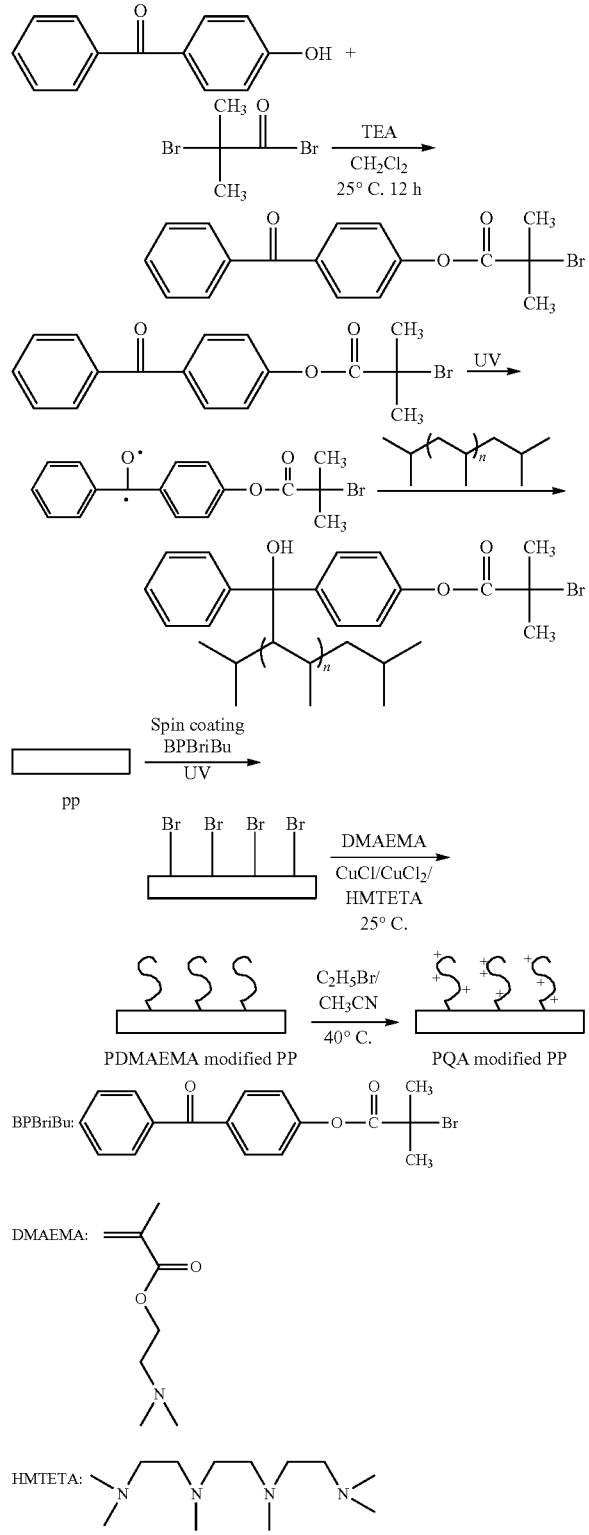

Schematic 3: (a) Synthesis of beznophenonyl bromoisobutyrate and benzophenone attachment chemistry and (b) schematic drawing of surface-initiated ATRP of DMAEMA.

As known in the art, for an atom transfer radical polymerization, the polymerizing can occur in the presence of a system initially comprising a transition metal complex and initiator comprising a radically transferable atom or group as described in the prior art, such as the references concerning atom transfer radical polymerization cited above. The radically transferable atom or group may be one of a halogen or a pseudohalogen. Suitable initiators can, for example, have the formula $$R_{11}R_{12}R_{13}C-X$$

wherein X is selected from the group consisting of Cl, Br, I, $OR_{10}$, $SR_{14}$, $SeR_{14}$, $OP(=O)R_{14}$, $OP(=O)(OR_{14})_2$, $OP(=O)OR_{14}$, $O-N(R_{14})_2$ and $S-C(=S)N(R_{14})_2$, where $R_{10}$ is alkyl of from 1 to 20 carbon atoms in which each of the hydrogen atoms may be independently replaced by halide, $R_{14}$ is aryl or a straight or branched $C_1$-$C_{20}$ alkyl group, and where an $N(R_{14})_2$ group is present, the two $R^{14}$ groups may be joined to form a 5- or 6-membered heterocyclic ring; and $R_{11}$, $R_{12}$ and $R_{13}$ are each independently selected from the group consisting of H, halogen, $C_1$-$C_{20}$ alkyl, $C_3$-$C_8$ cycloalkyl, $C(=Y)R_{15}$, $C(=Y)NR_{16}R_{17}$, COCl, OH, CN, $C_2$-$C_{20}$ alkenyl, $C_2$-$C_{20}$ alkynyl oxiranyl, glycidyl, aryl, heterocyclyl, aralkyl, aralkenyl, $C_1$-$C_6$ alkyl in which from 1 to all of the hydrogen atoms are replaced with halogen and $C_1$-$C_6$ alkyl substituted with from 1 to 3 substituents selected from the group consisting of $C_1$-$C_4$ alkoxy, aryl, heterocyclyl, $C(=Y)R_{15}$, $C(=Y)NR_{16}R_{17}$, oxiranyl and glycidyl; where $R_{15}$ is alkyl of from 1 to 20 carbon atoms, alkoxy of from 1 to 20 carbon atoms, aryloxy or heterocyclyloxy; and $R_{16}$ and $R_{17}$ are independently H or alkyl of from 1 to 20 carbon atoms, or $R_{16}$ and $R_{17}$ may be joined together to form an alkylene group of from 2 to 5 carbon atoms, thus forming a 3- to 6-membered ring; such that no more than two of $R_{11}$, $R_{12}$ and $R_{13}$ are H.

In the case of the bi-functional molecules of the present invention, the following general formula can be used:

$$R_1-S-Y$$

wherein $R_1$ is the photoinitiator group, S is a spacer group as known in the art (which can be present or absent) and Y is a CRP initiator. In the case of an ATRP initiator, the bi-functional molecule can be represented by the formula:

$$(R_1-S-)(R_{11})(R_{12})C-X$$

wherein $R_1$, S, $R_{11}$ and $R_{12}$ are defined as above.

Both of the above strategies were exemplified by forming thermoresponsive micropatterned gels attached to a substrate.

Although it can be difficult to prepare relatively thick polymer layers in a grafting-from approach, the grafting-from strategies of the present invention simplify tethering a functional group suitable for a grafting from CRP reactions that can, for example, be conducted in the presence of a limited volume of air (for example, in ARGET ATRP). In that regard, ARGET ATRP represents a recent advance in ATRP which has simplified and made more robust procedures for conducting a CRP from a solid flat substrate, making this approach less expensive and simpler to conduct. See, for example, PCT International Patent Application Nos. PCT/US2006/33792 and PCT/US2006/048656. The second strategy of the present invention thereby provides for a number of robust economical approaches to "grafting from." Moreover, the bi-functional molecules of the present invention can, for example, be tethered to a surface and combined, for example, with ARGET ATRP to provide industrially scalable procedures for a "grafting from" reaction. Moreover, the crosslinking strategies of the present invention can also be used to stabilize and interact with polymer brushes grafted from a surface, thereby providing for thicker, more stable polymer layers than previously possible.

In one study of the grafting to strategy of the present invention (in which a polymer/copolymer with photoresponsive functionality is first prepared), a first polymer including benzophenone methacrylate monomer units (as illustrated in Schematic 2) was deposited onto an inert polymer substrate. The first polymer was covalently coupled to the second polymer substrate while concurrently undergoing a crosslinking, or gel forming, reaction upon the application of UV energy as illustrated in Schematic 4 below. The photoactive benzophenone functional group in the first copolymer formed a radical under UV irradiation and abstracted H from the contacting polymer surface, forming a new chemical bond between the two polymers while, at the same time, other benzophenone units distributed throughout the bulk of the first copolymer film interacted with adjacent copolymer chains. (see FIG. 2) to form a crosslinked material. Subsequent quaternization of the thermo-responsive DMAEMA monomer units provided a relatively thick biocidal surface.

material used to illustrate one approach to forming a functional surface. The rate of incorporation of BPMA into the copolymer was constant over the reaction. Therefore, it is probable that a statistical copolymer was formed. The polymer solution was spun coated onto a polypropylene (PP) surface, followed by UV irradiation. As described above, UV light triggered the n–π* transition in the BPMA units, leading to a biradical triplet state that was capable of abstracting a hydrogen from almost any neighboring aliphatic C—H group including groups on the surface of the PP substrate and the copolymer itself, which led to formation of stable C—C bonds. As a result, a crosslinking network was formed, which was covalently attached to the surface. This method of the present invention provides significant advantages over existing techniques, exemplified by low cost of operation, mild reaction conditions, and high stability of the formed surface.

Figure 2:
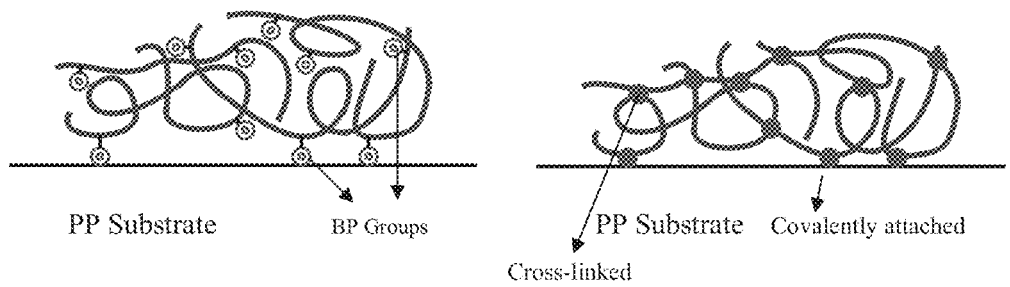
FIG. 2 illustrates a representation of simultaneous grafting to and crosslinking of a film of the present invention in contact with a polymer surface.

FIG. 2 illustrates a process of simultaneous "grafting to" and crosslinking of a benzophenone methacrylate/DMAEMA copolymer film in contact with a polypropylene surface that occurred when the contacting copolymer was subjected to UV radiation.

Figure 3:
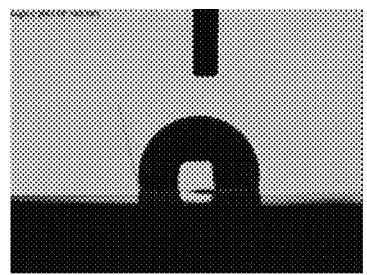
FIG. 3 illustrates a change in contact angle of a polypropylene surface after surface modification by covalent attachment and concurrent crosslinking of a benzophenone methacrylate/DMAEMA copolymer spun coated onto the surface.
Figure 3:
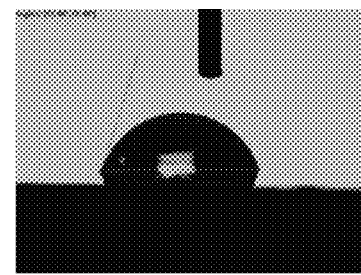

Polymer immobilization was confirmed by static contact angle measurements. FIG. 3 shows a freshly cleaned hydro- Schematic 4: Process steps for spin coating a polypropylene substrate with a benzophenone methacrylate/DMAEMA copolymer

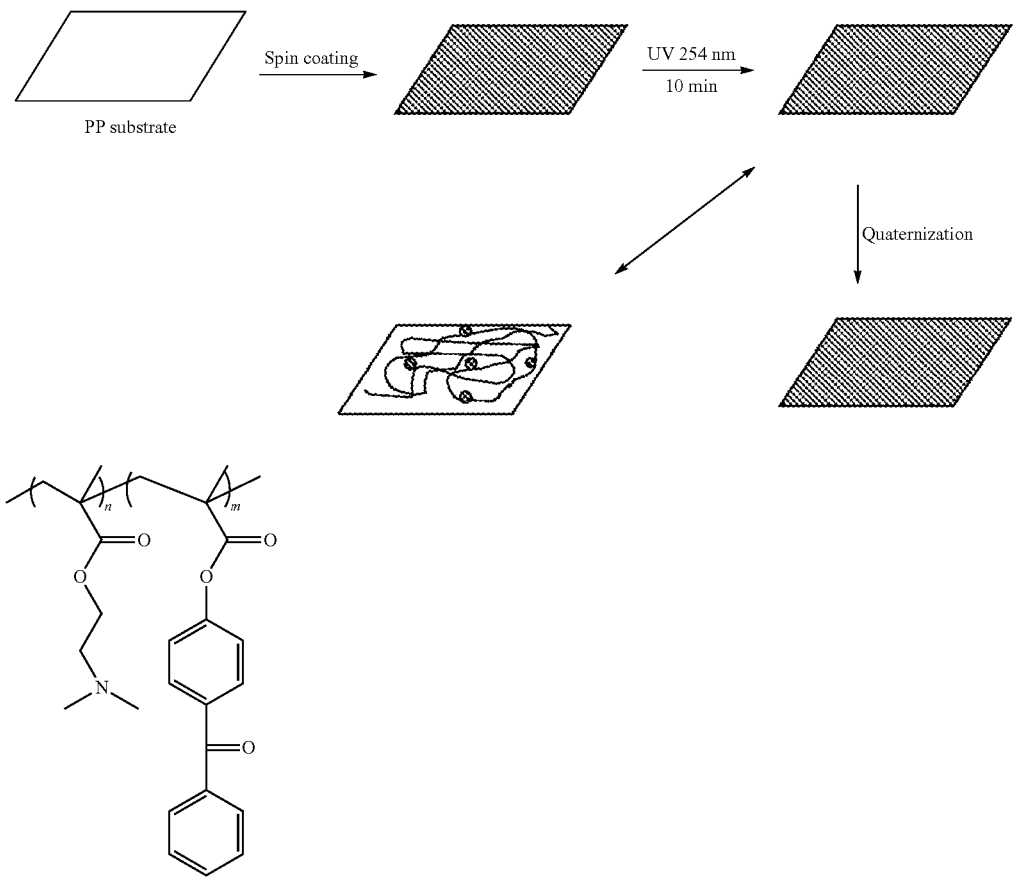

Poly(2,2-dimethylaminoethyl methacrylate) (PDMAEMA) containing evenly distributed benzophenone methacrylate (BPMA) monomer units was prepared by copolymerizing DMAEMA with BPMA via either ATRP or conventional radical polymerization as a non-limiting exemplary phobic PP surface which had a contact angle of 103° when a drop of water was deposited onto the surface. Introduction of the hydrophilic polymer network on the surface resulted in a dramatic decrease in the contact angle to 72°. After quaternization of the DMAEMA units, the contact angle continued to decrease to 67°. This change of the contact angle indicated a hydrophilic polymer layer was introduced onto the polypropylene surface.

Once again, thermoresponsive surfaces are attracting great interest because of their potential impact on numerous markets such as medical devices, artificial muscles, tissue engineering and micro/nano fluidic bioanalytical systems. To date most methods of constructing thermoresponsive surfaces have been accomplished by grafting the thermoresponsive polymer from the surface. Compared with previous "grafting from" techniques, the "grafting to" method of the present invention is relatively easy in terms of process and further provides a simple method for controlling the thickness of the deposited gel. A responsive polymer gel is tethered to a surface, rendering the surface responsive to changes in the environment. The thickness of the deposited gel can be controlled by procedures known to those skilled in the art including the method of application and the concentration of the first polymer, or resulting viscosity, in the contacting solution.

Most frequently, as noted above, previous polymer gels were formed by free radical polymerization (FRP). Crosslinked gels of N-isopropylacrylamide, vinylmethyl ether, vinyl acetate-co-vinyl alcohol, N-vinylcaprolactam, and N,N-dimethylaminoethyl methacrylate have been shown to exhibit discontinuous volume transitions with temperature in aqueous media. When changes in the polymer chain conformation occurs the gel can shrink or swell making them potentially attractive materials for microfluidic devices, artificial muscles, tissue engineering and drug delivery systems. However, a substantial drawback of the hydrogels prepared by FRP is their relatively slow response to applied stimuli. That problem is addressed in the present invention by using a CRP for the preparation of a copolymer comprising a functional group that can act to crosslink the deposited film after stimulation. The uniform molecular structure of the resultant copolymer provides a rapid response to stimuli (see FIG. 4C) and this type of thick film can find application, for example, in a microfluidic valve.

As described above, and further detailed in the experimental examples set forth below, poly(2,2-dimethylaminoethyl methacrylate) (DMAEMA) gels containing different concentrations of benzophenone methacrylate (BPMA) units were prepared for attachment to polymeric surfaces. The gel precursors were composed of well-defined DMAMEMA/BPMA copolymers prepared by ATRP. The uniformly dispersed BPMA units were used as crosslinking monomer units while PDMAEMA can additionally respond to temperature changes, showing a lower critical solution temperature (LCST) near 40° C. The easiest way of attaching this gel onto solid substrates includes the deposition of the polymer layer by any standard method for film preparation and subsequent crosslinking and concurrent tethering by photo-stimulation.

Figure 5:
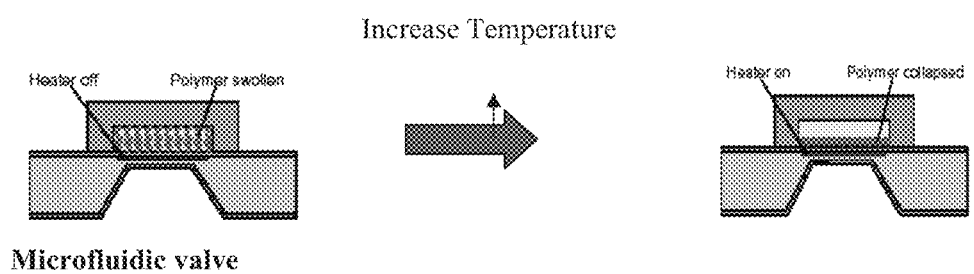
FIG. 5 illustrates a schematic of the use of a thick thermoresponsive gel of the present invention as a temperature responsive microfluidic valve; wherein the valve opens on heating and closes on cooling.

To further demonstrate the methods of the present invention for surface modification nano-patterned hydrogel structures were obtained using photo induced crosslinking of a well defined polymer layer spun-coated onto the substrate in the presence of coupling agents initially attached to silicon dioxide using a mask. We were able to demonstrate the crosslinking and the immobilization of thermoresponsive water soluble polymers onto the solid support after UV exposure. The reversible swelling and collapsing behavior of the resulting surface-immobilized gel was monitored quantitatively by following changes in the thickness of the film by AFM. (see FIG. 4A through 4C) We confirmed that the gel exhibited a reversible temperature dependent swelling and collapsing behavior with different degrees of swelling and that the response time of the gel was systematically influenced by variations in cross-linking density. Such a material can, for example, find application in microfluidic valves as illustrated in FIG. 5.

Figure 6:
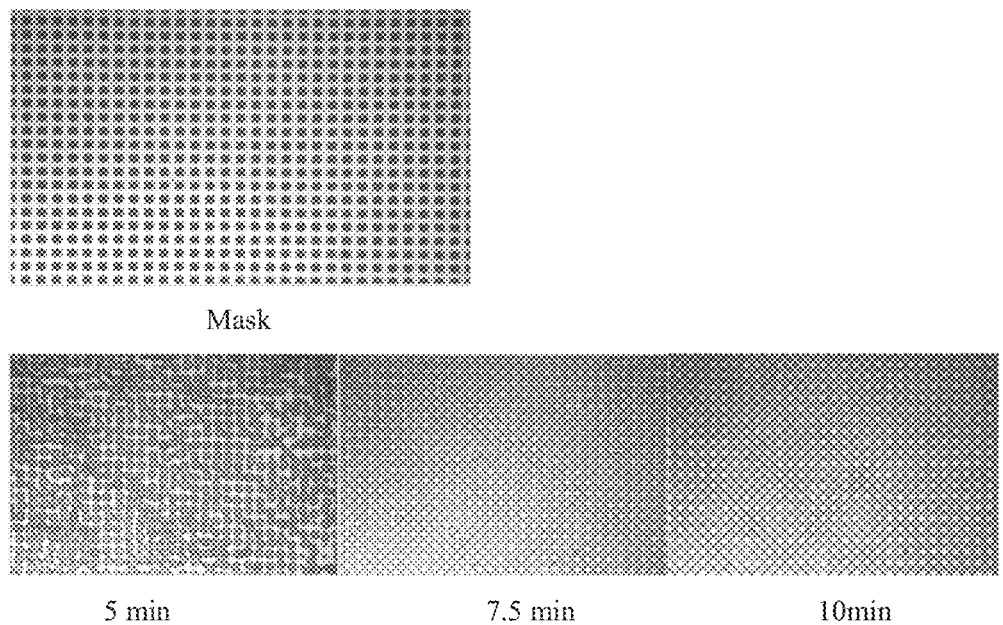
FIG. 6 illustrates the effect of varying photo-irradiation time to attain a well reproduced pattern.

PDMAEMA is a typical thermoresponsive polymer with LCST about 45° C. The introduction of a trace amount of photo-active BPMA into PDMAEMA has no substantial effect on the LCST but renders this polymer capable of crosslinking under UV irradiation, forming a thermoresponsive gel. Once again, PDMAEMA containing BPMA was synthesized via atom transfer radical copolymerization of DMAEMA and BPMA. To chemically attach the polymer gel onto a Si surface, a thin organic layer was introduced on the Si surface by reacting trimethoxypropane with surface silanol groups. The PDMAEA/BPMA copolymer solution (in methanol) was spun-coated onto the modified Si surface. The photo-patterning condition was optimized by varying the photo-irradiation time (see FIG. 4B). When a brief irradiation time (5 min) was applied, the pattern was not well-defined and some polymer was peeled off from the surface during subsequent treatments, which was believed to be a result of weak interaction between the polymer and surface (possibly arising from an insufficient number of chemical bonds formed between the patterned film and the surface). However, a substantially longer irradiation (10 min) led to overexposure, indicated by a decrease of the distance between the pillars of attached gel and an increase in the pillar size compared with the photo-mask. An acceptable irradiation time for this system was readily determined to be around 7.5 min where the patterned surface was similar to the photomask. (see FIG. 6) As clear to one skilled in the art, optimal exposure time will vary with energy of the photo source and the times reported herein are exemplary of the experimental conditions use herein and not a limiting indication of time required for well defined patterning of a substrate. Optimal exposure times are readily determined for a specific system and conditions by those skilled in the art.

Monitoring of the swelling-deswelling behavior of the patterned PDMAEMA gel was carried out using AFM in the presence of water. The change of the thickness of the polymer layer with temperature was clearly visualized by AFM. At room temperature, the thickness of the pattern was about 500 nm. When the temperature increased to 65° C., the mean decrease of thickness was about 250 nm. This example illustrates, for example, the possibility of patterning surfaces either for high value electronic applications or high volume applications such as direct deposition of a visual readable pattern or picture directly on a polymeric substrate including radically abstractable protons (such as directly depositing an image on a beverage bottle or, in a general manner, preparing a more polar surface).

Although the above studies describe the behavior of polymer gels attached to functionalized silicon wafers, the use of benzophenone units incorporated into a copolymer as a crosslinking species also allows one to immobilize the synthesized gels directly onto plastic surfaces which was previously quite challenging.

The above studies also demonstrate that the crosslink density of the tethered copolymer can be readily varied, which is of value, for example, in applications where continual or intermittent friction is expected, such as door knobs, children's toys, computer keyboards, and telephones. In the case that DMAEMA is rendered biocidal, the deposited film can render the surface antiseptic, while also modifying the bulk properties to attain a robust film resistant to intermittent friction.

The antimicrobial activity of quaternized DMAEMA was, for example, demonstrated in US Patent Application Publication No. 2006/0008490, the disclosure of which is incorporated herein by reference, wherein a "grafting from" technique was used (in which an ATRP initiator was attached to a substrate and polymerization from the attached initiator conducted). As described in US Patent Application Publication No. 2006/0008490, biocidally active groups suitable for use in the present invention include, but are not limited to, at least one of a quaternary ammonium salt, a quaternary phosphonium salt, a chloroamine etc. While the "grafting from" approach of US Patent Application Publication No. 2006/0008490 provides a certain degree of control over the physiochemical characteristics of the resultant polymer, such control (especially control over the architecture of the polymer) has been limited.

In contrast, the "grafting onto" approaches of the present invention offer precise control of polymer structure because polymers with the desired characteristics are synthesized separately. Additionally, unlike prior quaternary amine (QA) polymers which were prepared through conventional, uncontrolled radical polymerization, precise control in maintained over important structural parameters such as molecular weight, polydispersity and/or molecular architecture. The lack of control in conventional radical polymerization prevented one from determining how polymer structure or chain length affects the biocidal activity, thereby preventing optimization of polymer structure for the application. Additionally, the "grafting onto" procedures of the present invention can be conducted under mild conditions, whereas most of the "grafting from" approaches require complex surface modification reactions and strict reaction conditions to conduct the controlled (or uncontrolled) polymerization.

Figure 7:
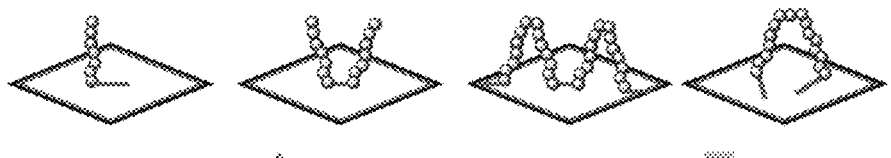
FIG. 7 illustrates the effect of the density of QA and chain structure on biocidal activity.
Figure 7:
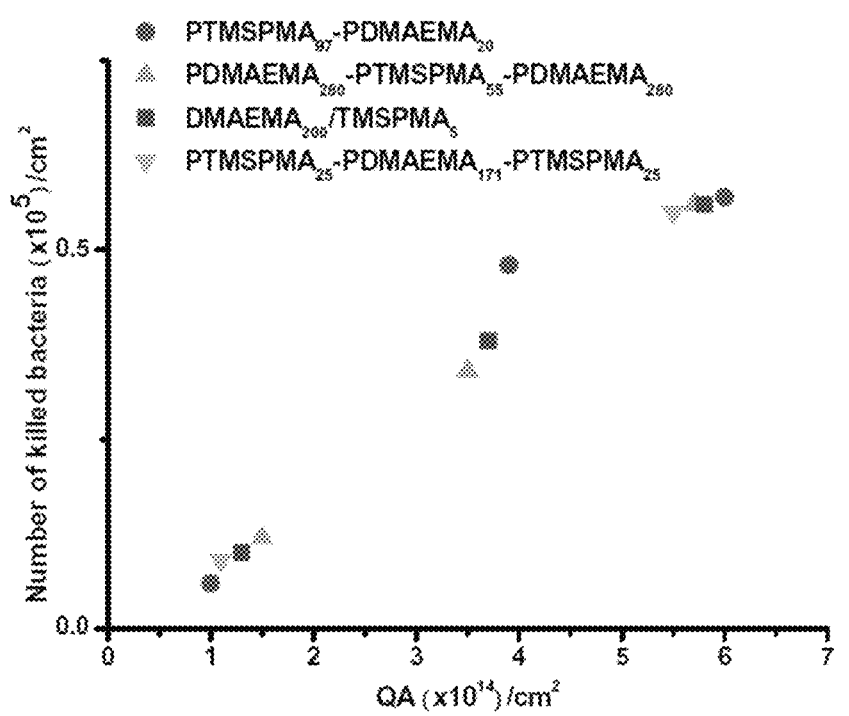

While grafting density for "grafting onto" reactions are usually lower than for the "grafting from" reactions, stable non-leaching biocidal surfaces can be attained using the "grafting onto" techniques of the present invention employing copolymers with distributed functionality. The monomer units with functionality selected to interact with the targeted substrate can include photoresponsive units as described above or can include monomer units with additional functionality designed to directly interact with the target substrate. In the case of well defined block copolymers prepared to target functionalization of, for example, a representative glass surface, it was determined that the grafting density of the polymer on target surfaces depended on the polymer structure and increased with polymer solution concentration and immobilization time until reaching a plateau for a selected composition by employing well-defined A-B, A-B-A, A-B-A-B-A and B-A-B block copolymers wherein one or more segments comprises PDMAEMA units (A-segments) and one of more segments monomer units with functionality selected to interact with the targeted surface or substrate (B-segments). See FIG. 7.

In that regard, in a series of exemplary PDMAEMA$_{97}$-b-PTMSPMAx diblock copolymers, (where PTMSPMA represents poly(3-(trimethoxysilyl)propyl methacrylate) segments), with a fixed length of PDMAMEA segment (DP=97) and varied lengths of PTMSPMA segments, maximal grafting density was observed when the ratio of $DP_{PDMAEMA}$ to $DP_{PTMSPMA}$ was close to 5:1 which provided sufficient robust tethering of the bio-active segments. The tertiary amino groups in the immobilized PDMAEMA segments were reacted with ethyl bromide to form biocidal quaternary ammonium groups. Alternatively, block copolymers with pre-quaternized PDMAEMA segments were attached to surfaces. Indeed immobilization was achieved via two approaches: (1) immobilization of PDMAEMA/PTMSPMA block copolymers onto the surface, followed by quaternization using ethyl bromide; (2) quaternization of DMAEMA/TMSPMA blocks, followed by immobilization. Incorporation of photo-responsive units into the PTMSPMA segment(s) could provide an additional method of attachment of the block copolymer to the target substrate.

Biocidal activity (defined as log kill) of the surfaces versus *Escherichia coli* (*E. coli*) with grafted polymers increased with the density of quaternary ammonium (QA) units on the surface. Log kill increased from 4.0 to 5.7 when the QA density increased from $1.9\times10^{14}$ to $11\times10^{14}$ QA units/cm$^{-2}$ i.e., 2 to 11 QA units/nm$^{2}$. Surfaces with similar density of QA possessed a similar level of biocidal activity. Biocidal activity did not show a strong dependence on block sequence or polymer chain length. (see FIG. 7) The covalent attachment of PQA via "grafting onto" methods of the present invention provides long-lasting biocidal activity that, unlike leachable systems, provides no danger to environment. Moreover, the "grafting onto" methods of the present invention allow facile investigation of the effects of chain length, grafting density, composition, architecture on biocidal activity of the modified surface. Representative applications include, but are not limited to, biomedical devices and health care products.

Other agents can interact with the amine groups incorporated into one or more polymer segments forming polyelectrolytes, polybetaines, sulfonates or phosphonates. An example is the formation of sulfobetaines through the ring-opening reaction between a tertiary amine and 1,3-propanesultone.

Moreover, functional groups other than aryl ketones, which can be modified or stimulated after a controlled radical polymerization to effect tethering of the polymer to a surface, can also be used in the present invention. Such other functional groups of monomer units can also operate as crosslinking agents and when incorporated into a (co)polymer of the present invention. Among the many possibilities is poly(4-vinylpyridine N-oxide) (poly4VPNO), which can be formed by the oxidation of poly(4-vinylpyridine) (poly4VP). Indeed poly4VP is itself a responsive material that can directly form polyelectrolytes, polybetaines and sulfonates.

Typically, copper bromide-based ATRP catalysts provide better polymerization control than their chloride analogues as a result of a more efficient role in the radical deactivation step. However, in special cases of ATRP of monomers forming dormant species that are prone to participate in nucleophilic substitution reactions with the solvent, monomer or polymer, the use of chloride-based ATRP catalyst is preferred to achieve good control and narrow molecular weight distribution of the polymers as a result of greater retention of reactivatable chain end functionality. When a copper bromide-based catalyst was used in the aqueous ATRP of 4-vinylpyridine (4VP), the polymers obtained had polymodal molecular weight distributions reflecting the formation of branched chains. The polymerization mediated by the $Cu^{I}$ complex of 2,2'-bipyridine was slow as a result of the low value of the ATRP equilibrium constant, in agreement with the low reducing power of the complex. The successful ATRP of 4VP was carried out in protic media at 30° C. using the $Cu^{I}Cl$ complexes of HMTETA or TPMA as the ATRP catalysts. The latter ligand forms a more reducing, and therefore catalytically more active $Cu^{I}$ complex than the former.

With many catalyst complexes, a significant part of the $Cu^{II}$ halide complex generated in the ATRP can dissociate in protic media, and the radical deactivation process becomes inefficient. However, neither the $Cu^{I}$ complexes of HMTETA nor TPMA disproportionate in water as a result of the low $\beta^{II}/$ $(\beta^I)^2$ [L] values. The use of a catalyst additionally containing initially $Cu^{II}Cl_2$ complex (30% of the total Cu) improved the polymerization control.

The poly4VP was converted into a well-defined ionic polymer, poly4VPNO by the peroxide oxidation of poly4VP as set forth in Schematic 5 below. The resultant water-soluble polymer can serve as complexing agent for various metal ions; fluorescent metal complexes have been reported. However, the polymer crosslinks easily upon irradiation with UV light and can thus be used as a convenient alternative to ketone-containing polymers.

Schematic 5: Preparation of poly(4-vinylpyridinium N-oxide)

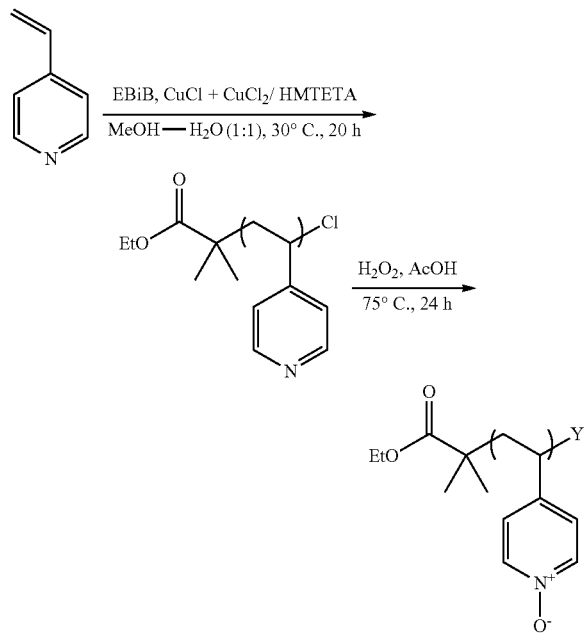

Figure 8:
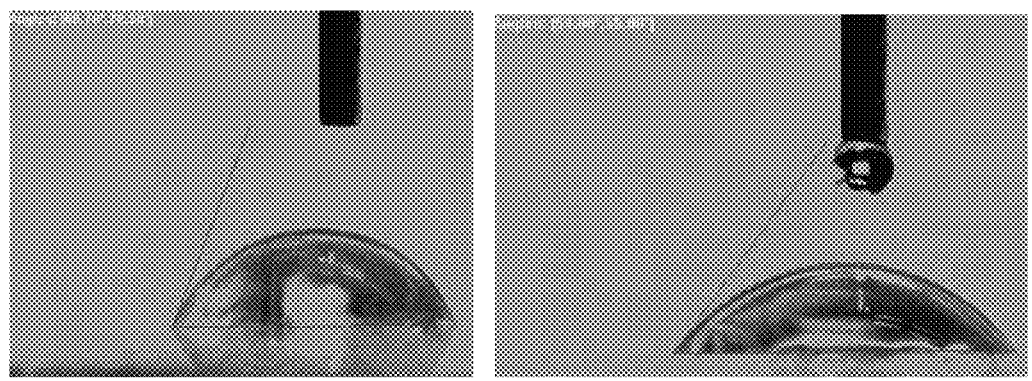
FIG. 8 illustrates contact angles of water droplet for polystyrene (left) and polycarbonate (right) surfaces after the photochemical attachment of poly4VPNO.

To demonstrate direct tethering of a copolymer comprising 4VPNO units to a substrate, a solution of poly4VPNO in methanol was deposited on various polymer surfaces (PP, polySty, and polycarbonate) and irradiated with UV light. The surfaces were sonicated to remove any free polymer, and the contact angles for water were measured (see FIG. 8). PP did not react with the poly4VPNO, but both polystyrene and polycarbonate did. The surfaces of those polymers became significantly more hydrophilic than the original surfaces after the attachment of the water-soluble polymer.

In the methods of the present invention, random and segmented polymers can be prepared that can interact with substrates and form stable functional surfaces presenting a modified property to the environment either directly or by interaction with an additionally deposited material. Copolymers with other topologies and architectures with similar functional groups will interact in a similar manner. Imparted functionality can range from high value bioresponsive surfaces to, for example, more mundane surfaces that form stable interactions with paints or inks.

EXPERIMENTAL EXAMPLES

Materials.

Dimethylaminoethyl methacrylate (DMAEMA, Aldrich 99%) was passed through a basic alumina column before use. CuCl was obtained from Aldrich and purified by stirring in glacial acetic acid overnight, filtering, and washing with dry ethanol. The monomer, 4VP, was passed through a column filled with basic alumina prior to use in order to remove the polymerization inhibitor. The macroinitiator, poly(ethylene oxide) methyl ether 2-bromosiobutyrate (MePEOBiB; molecular weight 699 g/mol), and tris(2-pyridylmethyl) amine (TPMA) were prepared by literature procedures. 3-Trimethoxypropyl silane (98%), ethyl 2-bromoisobutyrate (EBriBu) (98%), $CuCl_2$ (98%), 1,1,4,7,10,10-hexamethyltriethylenetetramine (HMTETA) (97%) were purchased from Aldrich and used without further purification however to remove oxygen from the macroinitiator and N,N,N',N'',N''',N''''-hexamethyldiethylenetriamine (HMTETA), 1-phenylethyl bromide (1-PhEtBr), 1-phenylethyl chloride (1-PhEtCl), and acetonitrile (MeCN) used in the determination of $K_{ATRP}$, the reagents were purged with nitrogen for at least 3-4 h prior to use.

Measurements. Monomer conversion was determined using $^1$H NMR, which was performed on a Bruker 300 MHz instrument. Molecular weights were analyzed using gel permeation chromatography (GPC) equipped with a Waters WISP 712 autosampler with dimethylformamide as a solvent, Polymer Standards Service columns (guard, $10^5$ Å, $10^3$ Å, 100 Å) in series, and a differential refractometer. Toluene was used as the internal standard and the molecular weights of polymers were determined using linear poly(methyl methacrylate) standards. AFM studies were carried out with the aid of a Nanoscope III (Digital Instruments, Santa Barbara, Calif.) equipped with phase extender module and vertical engage J scanner.

Abbreviations:
ATRP: Atom Transfer Radical Polymerization
NMP: Nitroxide Mediated Polymerization
RAFT: Reversible Addition Fragmentation Transfer
CCT: Catalytic Chain Transfer
CRP: Controlled/living Radical Polymerization
LCP: Living/Controlled Polymerizations
DP: Degree of Polymerization
LCST Lower Critical Solution Temperature
DMAEMA: 2-(dimethylamino)ethyl methacrylate
QA: Quaternary Amine
PP: Polypropylene
HDDA 1,6-hexanediol diacrylate
BP benzophenone
BPMA benzophenone methacrylate
BPBriBu: benzophenonyl 2-bromoisobutyrate
ITX isopropylthioxanthone
HCPK 1-Hydroxy-cyclohexyl-phenyl ketone
TMSPMA: 3-(trimethoxysilyl)propyl methacrylate
VPNO vinylpyridine N-oxide
PMDETA: N,N,N',N'',N''-pentamethyldiethylenetriamine
HMTETA 1,1,4,7,10,10-hexamethyltriethylenetetramine
TPMA tris(2-pyridylmethyl)amine
MePEOBiB poly(ethylene oxide) methyl ether 2-bromosiobutyrate
TMPS: 3-Trimethoxypropyl silane
EBriBu: ethyl 2-bromoisobutyrate:

Example 1

Preparation and Use of an ATRP Initiator Further Comprising a Thermoresponsive Functional Group This is an example of a simple robust procedure for attachment of initiating functionality to a polymer substrate for subsequent ATRP reactions. The fabrication approach is based on the photochemistry of benzophenone triggered by UV light (λ=365 nm). Benzophenone has a n–π* transition, resulting in the formation of a biradical triplet excited state that then abstracts a hydrogen atom from neighboring aliphatic C—H groups to form new C—C bond. Herein we use this photochemical technique to introduce benzophenonyl 2-bromoisobutyrate (BPBriBu, ATRP initiator) to a polymeric surface further comprising a radically transferable proton, such as polypropylene (PP) (see (a) of Schematic 3 above). The photoactive benzophenone functional groups in BPBriBu act as an anchor to promote the immobilization of the ATRP initiator by abstracting hydrogen from PP surfaces then forming C—C bonds. The tethered functional initiator is used in an ATRP to grow poly(2-dimethylaminoethyl methacrylate) (PDMAEMA) from PP surfaces comprising immobilized ATRP initiators. The surface tethered polymers were then converted to the corresponding PQA after a quaternization reaction using ethyl bromide. The chemical composition and wettability of the treated surface were determined by ATR-FTIR and water contact angle measurement, respectively. Biocidal activity was confirmed by a biocidal test against *Escherichia coli* (*E. coli*).

1a) Synthesis of Benzophenonyl Bromoisobutyrate (BPBriBu) a Tetherable ATRP Initiator).

4-Hydroxybenzophone (10 g, 0.05 mol), triethylamine (7.6 ml, 0.055 mol), and 30 ml of $CH_2Cl_2$ were added into a 100 mL round bottom flask. 2-Bromoisobutyryl bromide (6.8 mL, 0.055 mol) in 20 mL of $CH_2Cl_2$ was slowly added to the flask at 0° C. After the addition of 2-bromoisbutyryl bromide, the reaction mixture was kept at 0° C. for 1 h before increasing the temperature to 25° C. The white precipitate was filtered out after the reaction proceeded overnight. The obtained solution was washed with saturated bicarbonate water solution three times before drying with anhydrous magnesium sulfate overnight. The final product was obtained as white powder after filtration and evaporation of the solvent.

1b) Immobilization of ATRP Initiator on a Polymer Substrate.

A cleaned PP slide (1×1 cm) was dipped into BPBriBu solution (10 mg/ml) in toluene and dried using airflow. After irradiation under UV for 2 min, the surface was washed with $CH_2Cl_2$ in a Soxhlet apparatus to remove the physically attached initiator.

1c) ATRP of nBA (S, tBA) Initiated from PP Surfaces.

A typical polymerization procedure from PP surfaces immobilized with the initiator was as follows: PP slides (1×1 cm), 10 mL (0.07 mol) of nBA, 51 μL (0.35 mmol) of ethyl bromoisobutyrate (EBriBu), 79 μL (0.38 mmol) of N,N,N',N'',N''-pentamethyldiethylenetriamine (PMDETA), and 2 mL of anisole were added to a 25 mL Schlenk flask. After three freeze-pump-thaw cycles, CuBr (50 mg, 0.35 mmol) and $CuBr_2$ (7.8 mg, 0.035 mmol) were added under $N_2$. The reaction was carried out at room temperature. The polymerization was stopped by opening the flask to air when the designed molecular weight was reached. The physically attached polymer on the surface was removed via Soxhlet extraction overnight. The same catalyst system and same reaction conditions were utilized for ATRP of S and tBA.

1d) Hydrolysis of PtBA Brush on PP Surface.

The PP plate grafted with PtBA was immersed into 5 ml of methylene chloride. Then 0.5 ml of trifluoroacetic acid was added. After overnight reaction at room temperature, the PP plate was washed with methanol, followed by acetone.

1e) PS-b-PnBA Brushes Grafted from PP Surface.

A typical polymerization procedure was as follows: PP slides grafted with PnBA (1×1 cm), 10 mL (0.087 mol) of S, 61 μL (0.44 mmol) of ethyl bromoisobutyrate (EBriBu), 0.1 mL (0.48 mmol) of N,N,N',N'',N''-pentamethyldiethylenetriamine (PMDETA), and 2 mL of anisole were added to a 25 mL Schlenk flask. After three freeze-pump-thaw cycles, CuBr (63 mg, 0.44 mmol) and $CuBr_2$ (6.1 mg, 0.044 mmol) were added under $N_2$. The reaction was carried out at room temperature. The polymerization was stopped by opening the flask to air when the designed molecular weight was reached. The physically attached polymer on the surface was removed via Soxhlet extraction overnight.

1f) A typical polymerization procedure from PP surfaces immobilized with the initiator was as follows: PP slides (1×1 cm), 20 mL (0.6 mol) of DMAEMA, 44 μL (0.3 mmol) of ethyl bromoisobutyrate (EBriBu), 0.1 mL (0.36 mmol) of 1,1,4,7,10,10-hexamethyltriethylenetetramine (HMTETA), and 6 mL of acetone were added to a 25 mL Schlenk flask. After three freeze-pump-thaw cycles, CuCl (30 mg, 0.3 mmol) and $CuCl_2$ (8.1 mg, 0.06 mmol) were added under $N_2$. The reaction was carried out at room temperature. The polymerization was stopped by opening the flask to air when the designed molecular weight was reached. The physically attached polymer on the surface was removed via Soxhlet extraction overnight. A thermoresponsive polymer was thereby tethered to a polymer substrate.

1g) The polymer grafted PP slides prepared above were immersed in the mixture of ethyl bromide and acetonitrile (1/1, v/v) at 40° C. After reaction for 24 h, the slides were washed with methanol, water, and acetone. The tethered polymer was thereby converted into a biocidal polymer.

Example 2

ATRP of DMAEMA Initiated from PP Surface

ATRP of DMAEMA from the initiator attached PP surface was carried out in the presence of ethyl 2-bromoisobutyrate (EBriBu) and $CuCl/CuCl_2$/1,1,4,7,10,10-hexamethyltriethylenetetramine (HMTETA) as the sacrificial initiator and catalyst system, respectively (see (b) of Schematic 3). The addition of the sacrificial initiator led to the formation of free polymer, which was used to estimate the molecular weight characteristics of the obtained polymer chains on the surface, given that the similar structure of the chains at the surface and those in solution has been clearly demonstrated.

These polymerizations were well-controlled (see Table 1 below). Typical GPC profiles of samples taken during the polymerization (entry 4, Table 2) show that the molecular weight of the free polymer progressively increased and the polydispersity (PDI) remained relatively low during polymerization. The chain length of the polymer grafted on the surface was controlled by varying the feeding ratio of the monomer to the sacrificial initiator and/or the polymerization time. A series of polymer grafted surfaces were prepared where the molecular weight of the grafted polymer chains ranged from 1,500 g/mol to 35,000 g/mol.

The presence of PDMAEMA on the surface was confirmed by contact angle measurement. The contact angle of the untreated PP surface (FIG. 3, a) was 103°, while the contact angle of the treated surface was 72° (see FIG. 3B). Because the same procedure and reaction conditions were applied for the immobilization of the initiator, all surfaces were expected to possess similar densities of ATRP initiator and the resultant polymer chains. The polymer chain density was derived via dividing the amount of QA units by polymerization degree (DP) of PDMAEMA determined from GPC.

Figures 9A, 9B, 9C:
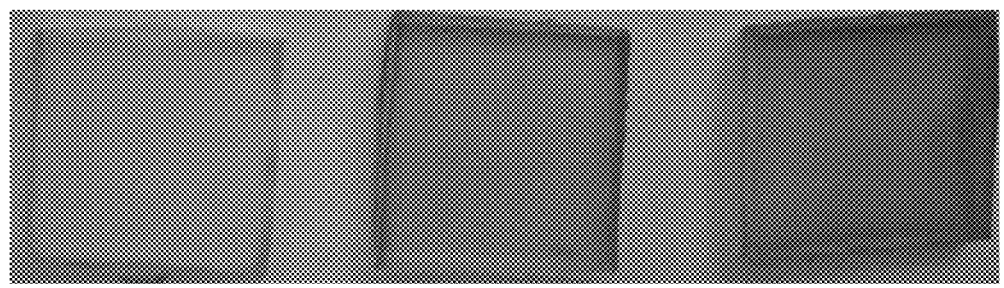
FIG. 9A illustrates a digital picture of a PP plate stained with fluorescein salt dye wherein the PP was modified with PDMAMEA ($M_n$=1,500 g/mol).
FIG. 9B illustrates a digital picture of a PP plate stained with fluorescein salt dye wherein the PP was modified with PDMAMEA ($M_n$=9,800 g/mol).
FIG. 9C illustrates a digital picture of a PP plate stained with fluorescein salt dye wherein the PP was modified with PDMAMEA ($M_n$=21,300 g/mol).

The amount of QA units on the surface was determined by measuring the amount of the complexing dye molecules using a colorimetric method based on fluorescent complexation and UV-VIS spectroscopy. Indeed, the chain densities on all these surfaces were similar (~0.2 chain/nm$^2$). As a result, surfaces grafted with higher MW polymer chain had a larger amount of polymer and consequent higher amount of QA after quaternization. FIG. 9 shows the digital images of the PP slides stained with fluorescein salt dye molecules that strongly bind to QA groups. It clearly shows an increase in color intensity with increase of the MW of the grafted polymer. The presence of PDMAEMA on the PP surface led to a dramatic change in surface wettability. As shown in Table 1, the untreated PP surface was very hydrophobic with a static contact angle (CA) of about 110°. After surfaces were grafted with hydrophilic PDMAEMA, they became more hydrophilic, as illustrated by a dramatic decrease in the contact angle (75~99°). In addition, a clear correlation was observed between the surface contact angle and the molecular weight of the grafted polymer. The water contact angle decreased with the increase in the molecular weight of the PDMAEMA on the surface. This was probably due to the fact that higher molecular weight polymer on the surface led to a higher degree of coverage of the hydrophobic substrate.

Figure 10A:
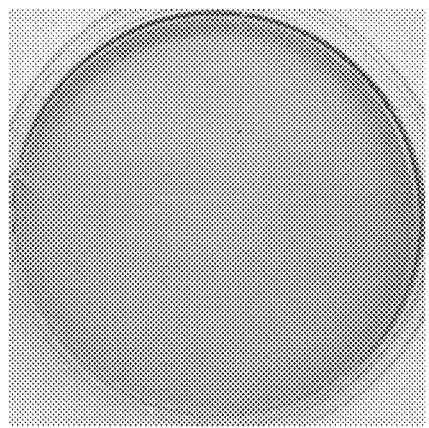
FIG. 10A illustrates a photograph of a L-agar plate onto which an *E. coli* suspension of distilled water treated with a PP slide after deposition and incubation for 24 hours.
Figure 10B:
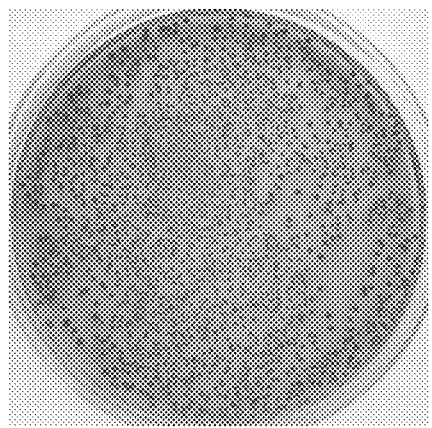
FIG. 10B illustrates a photographs of a L-agar plate onto which an *E. coli* suspension of distilled water treated with PP grafted with PQA after deposition and incubation for 24 hours, wherein the slides of FIG. 10A and FIG. 10B were shaken with 5 mL of a bacterial suspension for 1 h at 37° C. and the solution was taken, diluted appropriately, and plated on L-agar plates.

After quaternization, the water contact angle of the surface decreased further (60) 75° because PDMAEMA was converted to the more hydrophilic PQA. Additionally, PDMAEMA had also been converted to a biocidal functional material. (see far right-hand column in Table 1.)

unit/nm$^2$, entry 2-4, Table 1), essentially all the bacteria were killed. These experimental results agreed with those from the literature that demonstrated that higher density of QA led to higher biocidal activity in certain concentration range of QA. In the above cases, the chain density was constant and the difference in the density of QA is due to the difference in the chain length. A similar effect of the chain density and structure of polymers on the biocidal activity is expected. FIG. 9 shows the digital photos of L-agar plates incubated with the bacteria from the suspensions treated with the modified surface (entry 3, Table 1) and the unmodified surfaces, respectively. No colonies formed on the plate incubated with bacteria suspension treated by the modified surface (FIG. 10, a). The control plate however was covered with bacterial colonies (FIG. 10, b).

Thus, an exemplary antibacterial PP was prepared by introducing PQA on the surface via surface initiated ATRP of DMAEMA followed by quaternization. The molecular weight of polymer or the density of QA on the surface was well controlled. The surface biocidal activity against *E. coli* was assessed and found increasing with increase of the density of surface QA units. The surface (1×1 cm) with σ(QA)=2 unit/nm$^2$ killed 85% of the contacted bacteria while the ones with σ>14 unit/nm$^2$ killed all the bacteria.

TABLE 1

The contact angles of the PP surfaces and bioactivity

| Entry | DMAEMA: EBriBu:CuCl: CuCl$_2$:HMTETA | M$_n$ (g/mol) | PDI | CA (PP) | CA (PP with PDMAEMA) | CA (PP with PQA) | Grafting Density (σ) (chain/nm$^2$)/ (QA unit/nm$^2$) | Killing Percentage# (%) |
|---|---|---|---|---|---|---|---|---|
| Blank PP | | | | 100° | | | 0 | 0 |
| 1 | 100:1:2:0.4:2.4 | 1,500 | 1.16 | 100° | 99° | 75° | 0.23/2 | 85 |
| 2 | 200:1:2:0.4:2.4 | 9,800 | 1.18 | 110° | 93° | 66° | 0.22/14 | 99.98 |
| 3 | 400:1:4:0.8:4.8 | 21,300 | 1.21 | 110° | 83° | 64° | 0.20/31 | 100 |
| 4 | 400:1:4:0.8:4.8 | 35,100 | 1.22 | 110° | 75° | 60° | 0.19/42 | 100 |

The challenge: 2.9E+5 bacteria in 5 mL suspension; untreated PP was used as the blank.

Biocidal Activity.

The dynamic shake flask method has been used to assess the ability of the PP surface to kill bacteria. Modified and blank PP slides (1×1 cm) were shaken with 5 mL of a bacterial suspension containing 2.9×10$^5$ *E. coli* for 1 h at 37° C. Then the suspension was taken, diluted appropriately, and plated on L-agar plates. After overnight incubation the number of viable cells was then determined as colony forming units (CFU). Ideally, each surviving cell develops into a distinct colony after incubation, thus providing a direct measure of bacterial viability. Surface biocidal activity was represented by a kill percentage that was calculated based on Equation 1 where N$_{control}$ and N$_{sample}$ correspond to the colonies on the L-agar plates of the control and the sample, respectively, while F$_{control}$ and F$_{experiment}$ represent the dilution factor of the control and the sample, respectively.

Calculation of Percentage of the Bacteria Killed by the Surface $$\text{Killing percentage} = (F_{control} N_{control} - F_{sample} N_{sample}) / F_{control} N_{control} \qquad \text{Equation 1}$$

The density of QA played an import role in the biocidal activity. The surface grafted with low molecular weight PQA or low density of QA (1,500 g/mol, σ (QA)=2 unit/nm$^2$, entry 1, Table 1) exhibited relatively low biocidal activity, killing only 85% of the bacteria. However when the surfaces were grafted with higher MW PQA (>9,800 g/mol, σ (QA)>14

Example 3

Preparation and Use of Poly(DMAEMA-stat-BPMA) Copolymers

In this example, a convenient approach to immobilizing PDMAEMA gel on the Si surface and preparing patterned gel on the surface to facilitate the investigation of the thermoresponsive behavior of the gel is described. The gels were composed of well-defined poly(DMAEMA-stat-BPMA) copolymers prepared by ATRP. The BPMA units were used as crosslinking and tethering or immobilization moieties. This gel was attached onto solid substrates by the deposition of the polymer layer by a standard method for film preparation, followed by a subsequent photo-crosslinking/tethering. The cross-linking and the immobilization of thermoresponsive water soluble polymers onto the solid support after UV exposure was studied by atomic force microscopy (AFM). The reversible swelling and shrinking behavior of the surface-immobilized gel was monitored quantitatively by following changes in the film thickness by AFM.

Thus, the example describes the preparation of a thermoresponsive copolymer; further including a photo-responsive functional group, followed by deposition of a film onto a substrate prior to conducting a "grafting to" photo-induced tethering reaction. The example it also an exemplification of the preparation of a thick film functionalization of a surface.

3a) Synthesis of Benzophenone Methacrylate (BPMA).

Methacryloyl chloride (11.7 mL, 120 mmol) in DCM (50 mL) was added dropwise to a solution of 4-hydroxybenzophenone (20.0 g, 101 mmol) and triethylamine (20 mL, 150 mmol) in dichloromethane (DCM) (200 mL) at 0° C., and the resulting mixture was stirred at room temperature overnight. The mixture was washed with water (100 mL×2), saturated aqueous solution of $NaHCO_3$ (100 mL×2) and saturated aqueous solution of NaCl (100 mL). The organic layers were dried over anhydrous $MgSO_4$, filtered, and the solvent was evaporated. The resulting residue was purified by recrystallization from n-hexane; yield 3.2 g (87%), mp 66~68° C.

3b) Synthesis of DMAEMA/BPMA Copolymers.

A typical polymerization procedure was as follows: 4.3 mL (29 mmol) of DMAEMA, 0.19 g (0.71 mmol) of BPMA, 12 μL (0.08 mmol) of EBriBu, 44 μL (0.2 mmol) of HMTETA, and 2 mL of acetone were added to a 10 mL Schlenk flask. After three freeze-pump-thaw cycles, CuCl (16 mg, 0.16 mmol) and $CuCl_2$ (4 mg, 0.032 mmol) were added under $N_2$. The reaction was carried out at room temperature. Samples were taken periodically to analyze monomer conversion by $^1$H NMR and the molecular weight by GPC. The polymerization was stopped by opening the flask to air when the designed molecular weight was reached. The reaction mixture was then diluted with 10 mL of acetone and passed through a small neutral alumina column to remove the catalyst. The final pure product was obtained after precipitation into hexanes.

To investigate the swelling behavior of cross-linked PDMAEMA, copolymers with different mole fractions of BPMA were prepared, (see Table 2).

3c) Photo Patterning.

The Si wafers were activated by immersing them into a piranha solution ($H_2O_2$:$H_2SO_4$=3:7 (v/v)) for 1 h, followed by washing with deionized water, THF, and acetone. A monolayer of organic molecules was introduced onto the Si surface by immersing the wafers in a toluene solution of the trimethoxypropyl silane (20 mg/mL) with triethyl amine as the catalyst. After overnight reaction at 70° C., the wafers were washed with acetone. The polymer film was deposited on the modified Si surface by spin coating from a solution in $CHCl_3$ at a velocity of 2000 rpm and acceleration rate of 2000 rpm/s. The patterning of the polymer films was performed using a photo-mask with the feature size of 5 μm.

3d) Micropatterning of Hydrogel Films.

FIG. 4B shows the approach used to achieve patterned hydrogel films via photopatterning. First the Si substrate was modified to attach a monolayer of alkyl chains that acted as an adhesion promoter for the deposited patterned gel. This surface modification was achieved by immersing the wafers in a toluene solution of trimethoxypropyl silane. The condensation reaction between the trimethoxy groups in trimethoxypropyl silane and surface silanol groups led to the immobilization of the alkyl chains on the surface. A patterned hydrogel film was then prepared by photoirradiation of the spin-coated polymer layer on the modified Si substrate through a photomask with a feature size about 5 μm. The benzophenone methacrylate units in the copolymer work as the cross-linking element since irradiation of benzophenone leads to the formation of bioradicals that are capable of abstracting the hydrogen from neighboring aliphatic C—H groups, including adjacent polymer chains and the organic

TABLE 2

Synthesis of DMAEMA/BPMA copolymers containing different amounts of BPMA.

| Entry | [DMAEMA]:[BPMA] (in the feed monomer) | [DMAEMA]:[BPMA] (in the copolymer[1]) | Time (h) | DMAEMA Conversion[1] (%) | $M_n$ | $M_w/M_n$ |
|---|---|---|---|---|---|---|
| 1 | 400:10 | 400:9 | 29 | 48 | 28,500 | 1.20 |
| 2 | 400:20 | 400:18 | 29 | 55 | 32,800 | 1.22 |
| 3 | 400:40 | 400:38 | 31 | 46 | 28,800 | 1.33 |

[1]Determined from $^1$H NMR spectroscopy.

In all cases, controlled polymerizations were obtained; conversion increased regularly with time and the symmetrical GPC traces of samples taken periodically from the copolymerization moved cleanly to higher molecular weight with increased conversion. As the content of the BPMA was increased in the monomer initial feed the polymerization was slightly less controlled, demonstrated by increased PDI indicating that BPMA could affect ATRP of DMAEMA to some extent. However, the fraction of BPMA in the copolymers was readily controlled by varying the monomer feed ratio since DMAEMA and BPMA have similar reactivity ratios, as shown by the similar composition of the comonomer feed and the resulting copolymers. All copolymers synthesized in this study exhibited a lower critical solution temperature (LCST) in aqueous solution with the temperature of the phase transition dependent on the hydrophilic/hydrophobic balance. The LCST temperatures of the aqueous solution of the copolymers decreased with increasing content of MABP in the copolymer. Although the thermoresponsive behavior of the free linear polymer in solution is not expected to be identical to that of the gel attached to a surface, information on the phase transition behavior of the free polymer still provides data relevant to the study of the thermoresponsive behavior of the attached gels.

layer coated onto the silica surface. As a result, the exposed part of the film was cross-linked and covalently attached to the substrate. Uncross-linked polymer in the covered or masked part was completely removed by rinsing with methanol. Thus a negative image of the photomask was obtained. The preparation of a well-defined microstructured hydrogel pattern was desired to assist in the further investigation of the thermoresponsive behavior of the tethered gel by AFM, thereby differentiating the gels prepared by a controlled polymerization process from prior art materials.

3e) Hydrophilic/Hydrophobic Switchable Surfaces Via Photo-Patterning

Figure 11:
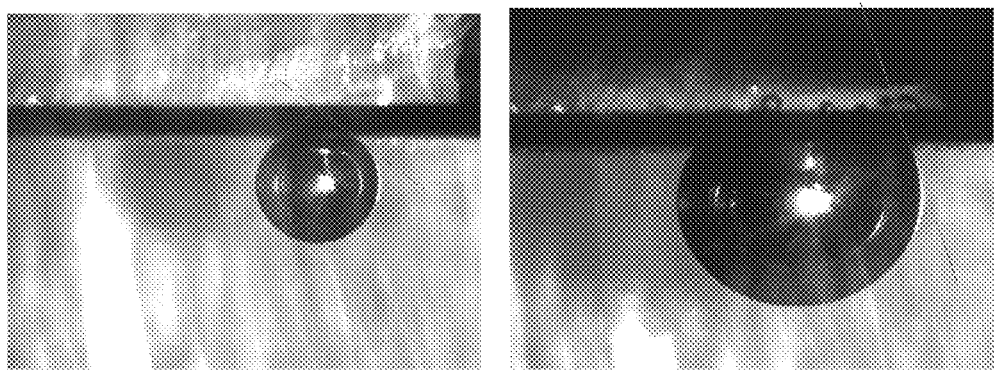
FIG. 11 illustrates a contact angle change on a patterned surface in response to temperature.

Patterned surface are normally obtained by spin-coating polymer solution on the silica surface modified with trimethoxypropylsilane, followed by photo-patterning. The bottom of the valley is trimethoxypropylsilane which is hydrophobic and has no response to temperature change. This hydrophobic layer probably affects the switchable surface. To solve the problem, we slightly modified the procedure, and a polymer layer was first introduced onto the silica surface and was cross-linked via photo-irradiation. Then another layer of polymer was introduced on the top of the cross-linked polymer layer. The patterned surface was obtained after photopatterning. A well-defined pattern on the surface (not shown), 20 µm wide polymer stripes spaced by about 20 µm, was observed using microscope. The change of surface wettability, which occurred in response to environmental temperature, was demonstrated by the change in contact angle with temperature. (See FIG. 11)

It was found that exposure time is one of the parameters in the preparation of a patterned gel and has to be adjusted with respect to the thickness of the polymer layer. When the exposure time was too short a poorly defined pattern was obtained as some of the patterned microgels lost definition. This may be because the short exposure time led to insufficient crosslinking among the polymer chains and an inadequate number of chemical bonds between the gel and the surface. As a result, the gel did not sufficiently adhere to the solid support. However when overexposure occurred, a blurring profile was observed from the pattern. (See FIG. 6)

The thickness of gel could be controlled by changing the polymer solution concentration. The thermoresponse of the polymer gel was investigated by AFM (see FIG. 4C).

This example illustrated how the tethering reaction of a photo-responsive polymer can be controlled by direct illumination of the contacting polymer solution and, further, how the tethered polymer can provide additional functionality such as thermosensitivity. Quaternization of the tethered DMAEMA units provides a biocidal surface.

This example also describes the preparation of well-defined poly(DMAEMA-stat-BPMA) copolymers with different compositions prepared via ATRP. The composition of the copolymer was controlled by adjusting the monomer feed ratio. When the resultant copolymers contained low BPMA content 5 mol %), a sharp phase transition in aqueous solution was observed with respect to the change in the environmental temperature. The copolymer containing 2.5 mol % of BPMA showed a higher LCST (35° C.) than the one containing 5 mol % of BPMA (33° C.).

The photoactive BPMA units in the copolymers allowed for preparation of patterned gel and immobilization on the Si substrate via UV treatment using photo-mask technique. The thickness of the polymer pattern increased from 8 nm to 80 nm when the polymer solution concentration was increased from 2.5 g/L to 20 g/L. Once again, the exposure time was found to be a feature of patterning proficiency. An optimal exposure time was found to be 7.5 min under the applied experiment conditions.

Contact mode AFM imaging of patterned hydrogel samples under water at different temperatures provided the evidence of their thermal responsiveness, manifested as changes of hydrogel patch heights.

Example 4

Preparation of Responsive Block Copolymers

4a) Synthesis of PDMAEMA Macroinitiator.

A typical polymerization procedure was as follows: 10 mL (60 mmol) of DMAEMA, 44 µL (0.3 mmol) of EBriBu, 0.2 mL (0.72 mmol) of HMTETA, and 2.5 mL of acetone were added to a 25 mL Schlenk flask. After three freeze-pump-thaw cycles, CuCl (59 mg, 0.6 mmol) and $CuCl_2$ (16.2 mg, 0.12 mmol) were added under $N_2$. The reaction was carried out at room temperature. Samples were taken to analyze the monomer conversion by $^1H$ NMR and the molecular weight by GPC at different time intervals during the polymerization. The polymerization was stopped by opening the flask to air when a targeted molecular weight was reached. The mixture was then diluted with 20 mL of acetone and passed through a small neutral alumina column to remove the catalyst. The final pure product was obtained after precipitating into hexanes.

4b) Synthesis of PDMAEMA-b-PTMSPMA Block Copolymer.

0.5 g (0.037 mmol) of PDMAEMA-Cl, 0.88 mL (3.7 mmol) of TMSPMA, 7.7 µL (0.037 mmol) PMDETA, and 2 mL of dried toluene were added to a dried 10 mL Schlenk flask. After three freeze-pump-thaw cycles, CuCl (3.7 mg, 0.037 mmol) was added under $N_2$. The flask was placed in a thermostated oil bath at 70° C. Samples were taken to analyze the monomer conversion by $^1H$ NMR and the molecular weight by GPC at different time intervals during the polymerization. The polymerization was stopped by cooling to room temperature and opening the flask to air when a designed molecular weight was reached. The mixture was then diluted with 5 mL dried toluene and passed through a small neutral alumina column. The final pure product was obtained after precipitating into dried hexanes and was stored as solution in toluene.

4c) Synthesis of PDMAEMA Difunctional Macroinitiator.

6.7 mL (44 mmol) of DMAEMA, 0.15 g (0.44 mmol) of difunctional initiator ($R_2$), 147 µL (0.53 mmol) of HMTETA, and 2.5 mL of acetone were added to a 25 mL Schlenk flask. After three freeze-pump-thaw cycles, CuCl (44 mg, 0.44 mmol) and $CuCl_2$ (12 mg, 0.09 mmol) were added under $N_2$. The reaction was carried out at room temperature. Samples were taken to analyze the monomer conversion by $^1H$ NMR spectroscopy and the molecular weight by GPC at different time intervals during the polymerization. The polymerization was stopped by opening the flask to air when a designed molecular weight was reached. The mixture was then diluted with 20 mL of acetone and passed through a small neutral alumina column. The final pure product was obtained after precipitating into hexanes.

4d) Synthesis of PTMSPMA-b-PDMAEMA-b-PTMSPMA triblock copolymer.

0.88 mL (3.6 mmol) of TMSPMA, 0.5 g (0.06 mmol) of PDMAEMA difunctional PDMAEMA macroinitiator, 16 µL (0.06 mmol) of PMDETA, and 2 mL of dried toluene were added to a dried 10 mL Schlenk flask. After three freeze-pump-thaw cycles, CuCl (6 mg, 0.06 mmol) was added under $N_2$. The flask was placed in a thermostated oil bath at 50° C. Samples were taken to analyze the monomer conversion by $^1H$ NMR during the polymerization. After the targeted MW was reached, the polymerization was stopped by cooling to room temperature and opening the flask to air. The mixture was then diluted with 5 mL dried toluene and passed through a small neutral alumina column. The final pure product was obtained after precipitating into dried hexanes and was stored as solution in dried toluene.

4e) Synthesis of PDMAEMA-b-PTMSPMA-b-PDMAEMA Triblock Copolymer.

0.3 mL (1.2 mmol) of TMSPMA, 15 mg (0.04 mmol) of difunctional initiator, 20 µL (0.08 mmol) of HMTETA, and 1 mL of toluene were added to a dried 10 mL Schlenk flask. After three freeze-pump-thaw cycles, CuCl (6 mg, 0.06 mmol) and $CuCl_2$ (2.7 mg, 0.02 mmol) were added under $N_2$. The flask was placed in a thermostated oil bath at 50° C. Samples were taken to analyze the monomer conversion by $^1H$ MR and the molecular weight by GPC at different time intervals during the polymerization. After 22 h, the monomer conversion reached 92%. 4 mL (24 mmol) of deoxygenized DMAEMA was then added to the reaction medium. At certain monomer conversion, the polymerization was stopped by cooling to room temperature and opening the flask to air. The mixture was then diluted with 5 mL dried toluene and passed through a small neutral alumina column. The final pure product was obtained after precipitating into dried hexanes and was stored as solution in dried toluene.

4f) Immobilization of Block Copolymers onto Glass Surfaces:

The glass slides (2.5 cm×7.5 cm) were activated by immersing them into a "piranha" solution ($H_2O_2:H_2SO_4=3:7$ (v/v)) for 1 h, followed by washing with deionized water, THF, and acetone. The immobilization of polymer was carried out by immersing the glass slides in a toluene solution of block copolymers (0.5-10 mg/mL) at 70° C. After targeted time, the glass slides were washed with THF, methanol, and acetone.

4g) Quaternization of PDMAEMA on the Surface.

The polymer grafted slides were immersed in the mixture of ethyl bromide and acetonitrile (1/1, v/v) at 40° C. After reaction for 24 h, the slides were washed with methanol, water, and acetone.

4h) Immobilization of PQA Block Copolymer.

1.25 g of PDMAEMA block copolymer was dissolved in a glass container with a 40 mL dried isopropanol, followed by addition of 10 mL of ethyl bromide. The quaternization reaction was carried out at 40° C. overnight and then the activated glass slides (2.5 cm×7.5 cm) were immersed in the reaction solution and the temperature was increased to 70° C. After the immobilization reaction, the glass slides were washed with THF and methanol.

4i) Microcontact Printing.

The well-defined polymer pattern with a space between the parallel polymer domains of about 50 μm was prepared via contact printing technique using a cross-linked poly(dimethylsiloxane) (PDMS) stamp, on which a polymer film was pasted from 10 mg/mL solution in toluene and then dried briefly. These coatings were further cured by heating at 60° C. for 1 h and then quaternized, according to the procedure described above. Any physically adsorbed excess polymer on the surface was readily removed by washing with methanol, whereas chemically attached block copolymer monolayers were intact even after harsh ultrasonic washing.

4j) Determination of Density of QA and Chain Grafting Density on the Surface.

The surface density of quaternary ammonium groups on the various glass surfaces was measured by a colorimetric method based on fluorescent complexation and UV-VIS spectroscopy. Quaternized glass slides (2.5 cm×1 cm) were dipped in a 1% solution of fluorescein (Na salt) in distilled water for 10 minutes, rinsed with distilled water, placed in 3 mL of 0.1% cetyltrimethylammonium chloride in distilled water, and shaken for 20 min to desorb the dye. The absorbance of the resultant aqueous solution was measured at 501 nm after adding 10 v % of 100 mM aqueous phosphate buffer, PH 8.0. The concentration of fluorescein dye was calculated taking an independently determined value of 69 $mM^{-1}$ $cm^{-1}$ as an extinction coefficient. The polymer chain density on the surface was derived via dividing the density of the QA by polymerization degree (DP) of PDMAEMA, assuming that one QA complexes with one dye molecule.

4k) Antimicrobial Activity Determination.

Antimicrobial testing was performed using a modified ASTM standard: E2149-01 Standard Test Method for Determining the Antimicrobial Activity of Immobilized Antimicrobial Agents under Dynamic Contact Conditions. A colony of E. Coli $K_{12}$ grown on a Luria agar (L-agar) plate was used to inoculate 5 mL of Luria broth in a sterile 50 mL conical tube. The culture was incubated at 37° C. while being shaken at 300 rpm (G24 Environmental Incubator Shaker, New Brunswick Scientific) for 18-20 h. The cells were diluted with Sorensen's Phosphate Buffer (pH 6.8, 0.3 mM $KH_2PO_4$) to the desired concentration. The actual number of cells used for a given experiment was determined by standard serial dilution. Polymer modified glass slides (1×2.5 cm) were incubated with 5 mL of cell suspension in a 50 mL conical tube (Falcon) at 37° C. and 300 rpm. An untreated glass slide was used as a control. Samples were taken after 1 h, diluted appropriately, plated on L-agar plates. Each viable bacterium developed into a bacterial colony that was identified using magnifying glasses and counted. The biocidal activity of surface was represented by log kill that was calculated based on equation 1 where $N_{control}$ and $N_{sample}$ correspond to the colonies on the L-agar plates of the control and the sample, respectively, while $F_{control}$ and $F_{experiment}$ represent the dilution factor of the control and experiment, respectively.

4l) Fluorescent Labeling and Microscopy.

To test the ability of the surface attached polymer to kill cells in situ, overnight cultures of E. coli were grown as above and diluted to ×$10^8$ colony forming units (CFU)/mL. 100 μL of cells was dropped onto the glass slide and covered with a glass coverslip. After 20 minutes incubation the slide was rinsed briefly in distilled water. Live/dead staining of E. coli was performed with the BacLight kit (Invitrogen). A solution of the stains was prepared according to the manufacturers instructions and 100 μL was dropped onto the slide and covered with a coverslip. After 15 minutes incubation in the dark the slide was rinsed with water and allowed to dry. The slides were observed using a Leica inverted microscope (Leica, Wetzlar Germany) equipped with a multiple fluorescent filter turret.

This example demonstrates that block copolymers can be designed to react directly with a target surface and additionally attach a functional polymer segment to the surface, herein a biocidal polymer. In this example, the surface was glass. However, as demonstrated in other examples the surface could be another type of surface such as a polymeric surface and the block copolymers can react with the surface via, for example, formation of a radical adapted to effect hydrogen abstraction (for example, via application of light energy to a block copolymer including segments with aryl ketone groups or poly(4-vinylpyridinium N-oxide).

Example 5

Preparation of Poly(4-vinylpyridine) and Conversion to Poly((4-vinylpyridinium N-oxide)

This example demonstrates incorporation of an alternate crosslinkable/tetherable unit into a copolymer prepared by a CRP. This example describes the development of conditions for the controlled polymerization of 4-vinylpyridine (4VP); followed by conversion of P(4VP) to a photoresponsive poly(4-vinylpyridinium N-oxide) (poly4VPNO) and formation of block copolymers.

5a) ATRP of 4VP in Aqueous Media.

It was first demonstrated that HMTETA could be successfully used as the ligand for the copper-mediated ATRP of 4VP. In order to prevent the loss of halide functional groups from the polymer chain ends CuCl-based catalysts were preferred. It was shown that polymers with narrow and monomodal MWDs were obtained. As with other ATRP reactions in protic solvents, the degree of control was additionally improved by the use of catalyst containing 30% of deactivator The polymerization was even faster and better controlled when a $CuCl+CuCl_2$ (0.7:0.3)/TPMA was used as the catalyst with 75% conversion attained in 7.5 hr with PDI less than 1.5.

5b) ATRP of 4VP in Protic Solvents.

A mixture of $CD_3OD$ (1 mL) and $D_2O$ (1 mL) was degassed by 6 freeze-pump-thaw cycles, the mixture was frozen in liquid nitrogen, the flask was filled with nitrogen, and $Cu^IBr$ (0.0266 g, 0.185 mmol) was added quickly. The flask was closed with a glass stopper, and was then evacuated and back-filled with nitrogen several times. Deoxygenated HMTETA (50.4 μL, 0.185 mmol) was injected and the reaction flask was placed in a water bath thermostated at 30° C. The nitrogen-purged monomer, 4VP (2 mL, 18.56 mmol) was added upon stirring followed by the MeOPEOBiB macroinitiator (0.108 mL). Samples were periodically withdrawn with a nitrogen-purged syringe, and were diluted with either $CD_3OD$ (NMR analysis) or 50 mM solution of LiBr in DMF (SEC analysis). Similar experiments were performed using mixtures of $Cu^IBr$ (0.0186 g, 0.130 mmol) and $Cu^{II}Br_2$ (0.0124 g, 0.055 mmol, 30% of the total Cu) and HMTETA. The complexes of $Cu^ICl$ and its mixtures with $Cu^{II}Cl_2$ (30% of the total Cu) with HMTETA (0.185 mmol), TPMA (0.185 mmol), or $Cu^IBr$ (0.185 mmol) with bpy (0.370 mmol) were also employed as catalysts.

5c) ATRP of 4VP in Organic Solvents.

Once it was determined that CuCl/TPMA was the best catalyst for the polymerization of 4VP, the reaction was studied in DMF. The reason was that several block copolymers with 4VP segments containing a hydrohobic block such as polystyrene or poly(methyl acrylate) had to be prepared to serve as precursors of photo-crosslinkable structures after conversion of the poly4VP units to the corresponding N-oxide (see next section). The ATRP of 4VP was well controlled in the temperature range 30-50° C. When an alkyl bromide macroinitiator is used, it is suggested that one conduct the polymerization with sufficient amount of chloride-based catalyst to quickly convert all the chain ends to chlorides. Otherwise, polymers with polymodal PDIs will be formed. To prepare segmented polymers with 4VP units and nonpolar segments, it is desirable to be able to carry out the ATRP of 4VP in nonprotic media. DMF was selected as the solvent since many polymers are well soluble in it.

ATRP of 4VP in DMF:

A mixture of DMF (3 mL) and 4VP (3 mL, 28 mmol) was degassed by 10 freeze-pump-thaw cycles, the mixture was frozen in liquid nitrogen, and the flask was filled with nitrogen. The flask was opened and a mixture of TPMA (0.0848 g, 0.292 mmol), CuCl (0.0192 g, 0.194 mmol), and CuCl2 (0.0133 g, 0.098 mmol) was added. The flask was quickly closed with a rubber septum, evacuated and back-filled with nitrogen several times. The mixture was then allowed to thaw in a water bath thermostated at 30° C., and the nitrogen-purged initiator, MePEOBiB of MW=699 g/mol (0.16 mL) was injected. Conversions were determined by GC. The results are presented in Table 3.

TABLE 3

ATRP of 4VP in DMF using $CuCl + CuCl_2$/TPMA as the catalyst

| Sample* | Time, min | Conv. (GC) | $M_n$, kg/mol** | PDI** |
|---|---|---|---|---|
| 3 | 165 | 0.061 | 5.76 | 1.05 |
| 4 | 295 | 0.120 | 6.83 | 1.06 |
| 5 | 440 | 0.163 | 7.85 | 1.07 |
| 6 | 1055 | 0.336 | 10.86 | 1.10 |
| 7 | 1750 | 0.416 | 12.79 | 1.12 |
| 8 | 2580 | 0.490 | 14.49 | 1.13 |

*The first two samples were taken after 30 and 85 min but the conversion was too low.
**PolySty standards were used.

Although the reaction was somewhat slow, the control over polymerization was excellent and narrow symmetrical SEC traces were observed up to about 50% conversion. Therefore, similar conditions can be used to prepare random, block and graft copolymers of 4VP and styrene, MMA, and MA for functionalization, crosslinking and/or tethering to a substrate.

The segmented copolymers can be further converted to crosslinkable micelles.

5d) ATRP of 4VP in DMF:

Polymers with 4VP are of interest since they are responsive (pH-sensitive) and because they can be easily converted to crosslinkable structures (via oxidation to the corresponding N-oxide).

Preparation of poly(4-vinylpyridinium N-oxide) (poly4VPNO):

A mixture of $CD_3OD$ (6 mL), $H_2O$ 2O (6 mL), and 4VP (12 mL) was degassed by 6 freeze-pump-thaw cycles, the mixture was frozen in liquid nitrogen, the flask was filled with nitrogen, and a mixture of CuCl (0.0768 g) and $CuCl_2$ (0.0448 g, 30% of the total Cu) was added quickly. The flask was then closed, evacuated and back-filled with nitrogen several times. Deoxygenated HMTETA (0.3 mL) was then injected and the reaction flask was placed in a water bath thermostated at 30° C. Nitrogen-purged EBiB (0.164 mL) was then added. The reaction was carried out for 20 h. The conversion reached 94% (by gravimetry). Thus, the reaction was slightly faster than reactions carried out in the presence of MePEOBiB macroinitiator. The polymer was precipitated in water and dried; it was analyzed by SEC: $M_n$=20800 g/mol, PDI=1.28 (monomodal and symmetrical MWD).

Poly4VP (2.0 g) was dissolved in 20 mL of glacial acetic acid and the mixture was heated to 75° C. Hydrogen peroxide (3 mL) was added and the mixture was stirred for 5 h. Then, another portion of the peroxide (7 mL) was added and the reaction mixture was kept at the indicated temperature for additional 19 h (total 24 h). Most of the solvent was removed by rotary evaporation and the polymer was precipitated in acetone. It was dried and analyzed by NMR spectroscopy (methanol-$d_4$): 7.6-9.0 ppm (broad m, 2H, aromatic $CHN^+$—$O^-$), 6.5-7.6 ppm (broad m, 2H, aromatic CH, adjacent to the polymer backbone). For comparison, the corresponding protons of poly4VP resonate at 7.9-8.4 ppm and 6.4-7.0 ppm. The polymer is a yellow solid, which is very soluble in water (hygroscopic) and methanol. It can be crosslinked onto polymeric surfaces.

5e) Preparation of Block Copolymers:

In recent years there is an increasing interest on amphiphilic block copolymers and related micelles in aqueous solution. Poly(n-butyl acrylate-b-poly(4-vinylpyridine) block copolymers were synthesized as model block copolymers comprising a precursor of a crosslinkable functionality but also because in aqueous solution the PnBA block in the model material should be the core of the micelle. Since PnBA has very low Tg (~−50° C.) the formed micelles would be in dynamic state that means the exchange of monomers between different micelles is possible resulting that the micelles may reach a thermodynamically stable state rather quickly. Further the block copolymers are pH sensitive and changing pH has a great influence on solubility and morphology of P4VP block in both aggregate and micelle form. The pyridyl group in poly(vinylpyridine) (PVP) has a distinct affinity to metals. Therefore P4VP or related block copolymers can be used to form polymer-metal nanocomposites or tether themselves to a metal substrate thereby functionalizing the surface.

A series of PnBA-b-P4VP block copolymers were synthesized with different compositions. Clear shifts were obtained in GPC chromatograms indicating high end group functionality. The ratio of monomer units in the blocks in the series of block copolymers prepared are: (PnBA/P4VP) 1/1, 1/1.5, 1/2.5, 2.5/1, 2/1, 1.5/1, 1/3 approximately. Polymerizations were carried out @60° C. Normal ATRP reactions were carried out with PMDETA as ligand and an ARGET ATRP was also applied as the initiation/reactivation system with TPMA as ligand and chloroacetonitrile as initiator.

In a typical reaction the following ratio of reagents were used to prepare the PnBA block: n-BA:M2ClPr:CuCl:CuCl$_2$:PMDETA ratio of 300:1:0.9:0.1:1. After 7.5 hr conversion was 24% and after 18.5 hr 35% with a MW by GPC=16,000 and PDI=1.28.

The ARGET initiated system and a ratio of reagents: n-BA:ClACN:CuCl$_2$:TPMA:Sn(EH)$_2$ of 1600:1:0.1:0.3:0.5; and formed a polymer with a MW by GPC=125,000 and PDI=1.33.

Chain extension was conducted @50° C. in DMF using the following typical ratio of reagents: 4-VP:PnBA:CuCl:CuCl$_2$:TPMA equal to 295:1:2.05:0.9:2.95 yielding a block copolymer with ratio of blocks 1:1 and a PDI 1.24.

The block copolymer formed micelles in acidic aqueous solution.

Micellization in Water:

10 mg of PnBA-b-P4VP block copolymer was dissolved in 10 mL DMF and stirred for 2 h. 30 mL 1/1 methanol/water mixture was slowly added to this mixture and the solution stirred for three days. After dialysis with aqueous HCl solution DLS measurements were conducted. Micelle size was ~220 nm. The size of the micelle decreased on addition of base (NaOH) to ~173 nm which can be attributed to a decrease in the repulsion of the pyridine groups due to neutralization. Full neutralization of pyridine units gives rise to formation of huge aggregates, because it is not soluble in water anymore.

Further Chain Extension of PnBA-b-P4VP:

Chain extension polymerization was performed to show the chain end functionality.

For PBA-b-P4VP macroinitiator M$_{nGPC}$=33250, M$_w$/M$_n$=1.24 the ratio of reagents were [4-VP]$_0$:[PBA-b-P4VP]$_0$:[Cu(I)Cl]:[Cu(II)Cl]:[TPMA]=500:1:4.2:1.8:6 after 31 h the conversion was 36%. There was a clean chain extension.

Block copolymers were prepared using polymethyacrylate macroinitiators (PDI 1.16-1.2) forming well defined materials with final PDI 1.15-1.24.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A polymer solution consisting essentially of a solvent system and a polymer which is the reaction product, via a controlled radical polymerization of radically (co)polymerizable monomers, the (co)polymerizable monomers comprising at least one monomer comprising at least one group that can be modified after the controlled radical polymerization by application of energy to the polymer to form a radical, the polymer having a polydispersity less than 2.0, wherein the radical is adapted to react with a substrate comprising a radically abstractable proton to tether the polymer from solution to the substrate.

2. The polymer solution of claim 1, wherein the energy is light energy.

3. The polymer solution of claim 1 wherein the at least one group is an aryl ketone group.

4. The polymer solution of claim 3, wherein the at least one aryl ketone group comprises one of the following radicals benzophenone-, acetophenone-, benzyl-, benzoin-, hydroxyalkylphenone-, phenyl cyclohexyl ketone-, anthraquinone-, trimethyl-benzoylphosphine oxide-, methylthiophenyl morpholine ketone-, aminoketone-, azobenzoin-, thioxanthone-, hexaarylbisimidazole-, triazine-, or fluoroenone-.

5. The polymer solution of claim 1 wherein the polymer has a polydispersity less than 1.5.

6. The polymer solution of claim 1 wherein the radical is adapted to tether the polymer to a substrate via covalent bonding.

7. The polymer solution of claim 6 wherein the energy is light energy.

8. The polymer solution of claim 1 wherein the radical is adapted to reaction with a substrate comprising a polymeric surface which comprises radically abstractable protons and a deposition of a film of the polymer results in a surface more polar than a surface of the substrate prior to tethering the polymer thereto.

9. The polymer solution of claim 1 wherein the at least one group is also modifiable to effect crosslinking of the polymer after the controlled radical polymerization.

10. The polymer solution of claim 1 wherein the polymer has a polydispersity less than 1.2.

11. The polymer solution of claim 1 wherein the polymer has a known average number of the at least one monomer distributed therein.

12. The polymer solution of claim 1 wherein the radically (co)polymerizable monomers include at least one other monomer selected to effect a desired property on the surface of the substrate.

13. The polymer solution of claim 12 wherein the at least one other monomer is selected to effect at least one of hydrophilicity, hydrophobicity, biocompatibility, bioactivity, adhesion, adsorption, corrosion resistance, abrasion resistance, temperature insulation, electrical insulation, impact resistance, hardness, softness, swellability, and cushioning for improved ergonomics or thermal responsiveness.

14. The polymer solution of claim 13 wherein the at least one other monomer comprises at least one group that can be converted to a quaternary salt, an electrolyte, a betaine, a sulfonate or a phosphonate.

15. The polymer solution of claim 13 wherein the at least one other monomer is 2-(dimethylamino)ethyl methacrylate (DMAEMA), 4-vinyl pyridine, 2-vinyl pyridine, N-substituted acrylamides, N-acryloyl pyrrolidine, N-acryloyl piperidine, acryl-L-amino acid amides, acrylonitriles, methacrylonitriles vinyl acetates, 2-hydroxy ethyl methacrylate, or p-chloromethyl styrene.

16. The polymer solution of claim 15 wherein the group of the at least one other monomer is an amino group that can be converted to a quaternary salt by a process comprising reaction of the group with an alkyl halide.

17. The polymer solution of claim 1 wherein the at least one group can be modified in an open air atmosphere.

18. The polymer solution of claim 1 wherein the polymer comprises a block copolymer wherein one segment can react directly with a target substrate and additionally attach a functional polymer segment to the substrate, and a second segment imparts a predetermined physiochemical property to the surface.

19. The polymer solution of claim 1 wherein the at least one monomer is incorporated into the backbone of the polymer, in at least one block of the polymer, in at least one graft on the polymer, or in at least one branch of the polymer.

20. The polymer solution of claim 19 wherein the polymer is a block copolymer and the at least one monomer comprising at least one group that can be modified after the controlled radical polymerization is incorporated into at least one block of the block copolymer.

\* \* \* \* \*